United States Patent
Rivera et al.

(10) Patent No.: US 12,238,521 B2
(45) Date of Patent: Feb. 25, 2025

(54) ENHANCED AUTHENTICATION PROCEDURE FOR O-RAN NETWORK ELEMENTS

(71) Applicant: RAKUTEN MOBILE, INC., Tokyo (JP)

(72) Inventors: Francesca Rivera, Tokyo (JP); Raghavendran Ramiya, Bengaluru (IN); Ritesh Kumar Kalle, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/799,121

(22) PCT Filed: Apr. 13, 2022

(86) PCT No.: PCT/US2022/024597
§ 371 (c)(1),
(2) Date: Aug. 11, 2022

(87) PCT Pub. No.: WO2023/154071
PCT Pub. Date: Aug. 17, 2023

(65) Prior Publication Data
US 2024/0187858 A1  Jun. 6, 2024

Related U.S. Application Data

(60) Provisional application No. 63/318,898, filed on Mar. 11, 2022, provisional application No. 63/309,877, filed on Feb. 14, 2022.

(51) Int. Cl.
*H04W 12/069* (2021.01)
*H04L 61/5014* (2022.01)

(52) U.S. Cl.
CPC ....... *H04W 12/069* (2021.01); *H04L 61/5014* (2022.05)

(58) Field of Classification Search
CPC .. H04W 12/069; H04W 92/12; H04L 61/5014
See application file for complete search history.

(56) References Cited

U.S. PATENT DOCUMENTS 11,258,794 B2 * 2/2022 Adiga .................. H04L 63/205
11,870,768 B1 1/2024 Vishwakarma et al.
(Continued)

OTHER PUBLICATIONS

Abdalla et al., "Toward Next Generation Open Radio Access Networks—What O-RAN Can and Cannot Do!", IEEE Network Magazine, Mar. 2022, pp. 1-8 (8 pages total).
(Continued)

*Primary Examiner* — Kabir A Timory
(74) *Attorney, Agent, or Firm* — Sughrue Mion, PLLC

(57) ABSTRACT

A system, method and device for enhanced authentication of network elements are provided. The device may be configured to: obtain device information from a network element, transmit the obtained device information to a storage device in order to determine whether the network element supports authentication in accordance with a first authentication protocol, based on determining that the network element supports the authentication in accordance with the first authentication protocol, facilitate authentication of the network element with a first authentication server configured to perform the authentication in accordance with the first authentication protocol, and based on determining that the network element does not support the authentication in accordance with the first authentication protocol, facilitate the authentication of the network element with at least one server configured to perform authentication in accordance with a second authentication protocol.

20 Claims, 15 Drawing Sheets

(56) References Cited

U.S. PATENT DOCUMENTS

2003/0219129 A1\* 11/2003 Whelan .............. H04L 63/0428
380/270
2006/0075219 A1 4/2006 Callaghan et al.
2019/0324419 A1 10/2019 Lutz et al.
2023/0179429 A1 6/2023 Rosenthol et al.

OTHER PUBLICATIONS

International Search Report dated Oct. 6, 2022 from the International Searching Authority in International Application No. PCT/US2022/024597.
Written Opinion dated Oct. 6, 2022 from the International Searching Authority in International Application No. PCT/US2022/024597.

\* cited by examiner

ENHANCED AUTHENTICATION PROCEDURE FOR O-RAN NETWORK ELEMENTS

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based). Thus, the traditional network architecture which is designed to support NEs provided by a specific vendor is no longer suitable. Further, since the number of parties involved in the network is increasing, securing network communication via traditional methods of authenticating and verifying vendor-specific NEs is no longer suitable in the multi-vendor environment.

Moreover, different network elements included in the radio access network may have different authentication capabilities. For example, some network elements may support IEEE 802.1x authentication in the O-RAN fronthaul CUS Plane (Control Plane, User Plane, Synchronization Plane), whereas others may not yet have such capability.

In view of the above, there is a need to provide a system which supports deployment of multiple types of NEs. To this end, there is a need to provide a system which can efficiently and securely authenticate NEs with different authentication capabilities, to thereby provide a secure connection between the NEs.

SUMMARY

According to example embodiments, systems and methods are provided that allow for non-virtual machine (VM) based network elements (NEs) in a radio access network (RAN) to perform certificate enrollment via a Certificate Authority (CA) server in a secure and authenticated manner.

According to example embodiments, systems and methods are provided that allow for fully automated enrollment of certificates for non-VM based NEs in the RAN, and that allow for semi-automated enrollment of certificates for non-VM based NEs in the RAN.

According to example embodiments, systems and methods are provided that securely authenticate a NE and securely provide information of a CA server to the NE.

According to example embodiments, systems and methods are provided that enable different types of NEs from one or more vendors to enroll certificates from one CA server.

According to example embodiments, systems and methods are provided that allow for semi-automated enrollment of certificates as a fallback certificate enrollment method, e.g., where a component for a fully automated enrollment fails or where a particular NE does not support auto-enrollment.

According to example embodiments, systems and methods are provided that allow for an enhanced authentication procedure, enabling non-VM based NEs with and without 802.1x authentication support to coexist in an operator network (e.g., open fronthaul O-RAN operator network).

According to example embodiments, a system for performing an enhanced authentication procedure in a mobile communications network, includes: a first network element with IEEE 802.1x support; a second network element without IEEE 802.1x support; a storage device configured to store authentication capabilities of network elements in the mobile communications network; a switch configured to obtain device information from the first network element and the second network element, and to transmit the obtained device information to the storage device in order to determine whether each of the first network element and the second network element supports IEEE 802.1x authentication; a first authentication server configured to perform authentication in accordance with IEEE 802.1x; at least one server configured to perform DHCP authentication; and an operator certificate authority configured to enroll certificates for network elements in the mobile communication network, wherein the first network element is configured to initiate the IEEE 802.1x authentication with the switch based on the switch determining that the first network element supports the IEEE 802.1x authentication, the first authentication server is configured to authenticate the first network element, and the first network element is configured to enroll a certificate with the operator certificate authority based on a successful authentication, and wherein the second network element is configured to initiate a DHCP authentication with the at least one server configured to perform DHCP authentication based on the switch determining that that the second network element does not support the IEEE 802.1x authentication, to obtain information on the operator certificate authority from the at least one server upon authentication, and to enroll a certificate with the operator certificate authority based on the obtained information on the operator certificate authority.

The device information may include at least one of vendor name, model identifier, and serial number.

The second network element may be configured to initiate the DHCP authentication with the at least one server, via the switch.

The at least one sever may include a DHCP server and a second authentication server; and the DHCP server may be configured to: receive, from the switch, a request by the second network element for obtaining the information on the operator certificate authority, the request including at least one security parameter, send the at least one security parameter to the second authentication server to perform an authentication of the second network element, receive a result of the authentication from the second authentication server, and send, to the switch, the information on the operator certificate authority based on the result of the authentication indicating a successful authentication.

The at least one security parameter may include a device certificate pre-installed at both the second network element and the second authentication server; and the second authentication server may be configured to perform the authentication by verifying, using the device certificate pre-installed therein, the device certificate included in the at least one security parameter.

The switch may be configured to: acknowledge to the first network element that support of the IEEE 802.1x authentication is verified for the first network element, based on determining via the storage device that the first network element supports the IEEE 802.1x authentication; and acknowledge to the second network element that the IEEE 802.1x authentication is not supported for the second network element, based on determining via the storage device that the second network element does not support the IEEE 802.1x authentication The switch may be configured to obtain the device information in accordance with a Layer 2 discovery protocol.

The storage device may be an inventory database that maintains IEEE 802.1x capability information for different network elements of different vendors.

The first network element may be an O-RAN Radio Unit (O-RU) of a first vendor, and the second network element may be an O-RU of a second vendor.

According to example embodiments, a network device for facilitating authentication of network elements in a mobile communications network, includes: a memory storing instructions; and at least one processor configured to execute the instructions to: obtain device information from a network element, transmit the obtained device information to a storage device in order to determine whether the network element supports authentication in accordance with a first authentication protocol, based on determining that the network element supports the authentication in accordance with the first authentication protocol, facilitate authentication of the network element with a first authentication server configured to perform the authentication in accordance with the first authentication protocol, and based on determining that the network element does not support the authentication in accordance with the first authentication protocol, facilitate the authentication of the network element with at least one server configured to perform authentication in accordance with a second authentication protocol, obtain information on an operator certificate authority from the at least one server upon successful authentication, and provide the obtained information on the operator certificate authority to the network element.

The first authentication protocol may be an IEEE 802.1x authentication protocol.

The at least one processor may be configured to facilitate the authentication, with the first authentication server, as an IEEE 802.1x Authenticator configured to collect authentication credentials from Supplicants and sending the authentication credentials to the first authentication server.

The second authentication protocol may be a DHCP authentication.

The at least one processor may be configured to facilitate the authentication, with the at least one server, by receiving authentication credentials from the network element and sending the authentication credentials to a DHCP server from among the at least one server.

According to example embodiments, a method of authenticating network elements in a mobile communications network, includes: obtaining first device information from a first network element; transmitting the obtained device information to a storage device in order to determine whether the first network element supports authentication in accordance with the first authentication protocol; and based on determining that the first network element does not support the authentication in accordance with the first authentication protocol, facilitating authentication of the first network element with at least one server configured to perform authentication in accordance with a second authentication protocol, obtaining information on an operator certificate authority from the at least one server upon successful authentication, and providing the obtained information on the operator certificate authority to the first network element.

The method may further include: obtaining second device information from a second network element; transmitting the obtained device information to the storage device in order to determine whether the second network element supports the authentication in accordance with the first authentication protocol; based on determining that the second network element supports the authentication in accordance with the first authentication protocol, facilitating authentication of the second network element with an authentication server configured to perform the authentication in accordance with the first authentication protocol.

The first authentication protocol may be an IEEE 802.1x protocol, and the second authentication protocol may be a DHCP protocol.

The facilitating the authentication of the first network element with the at least one server may include receiving authentication credentials from the first network element and sending the authentication credentials to a DHCP server from among the at least one server.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
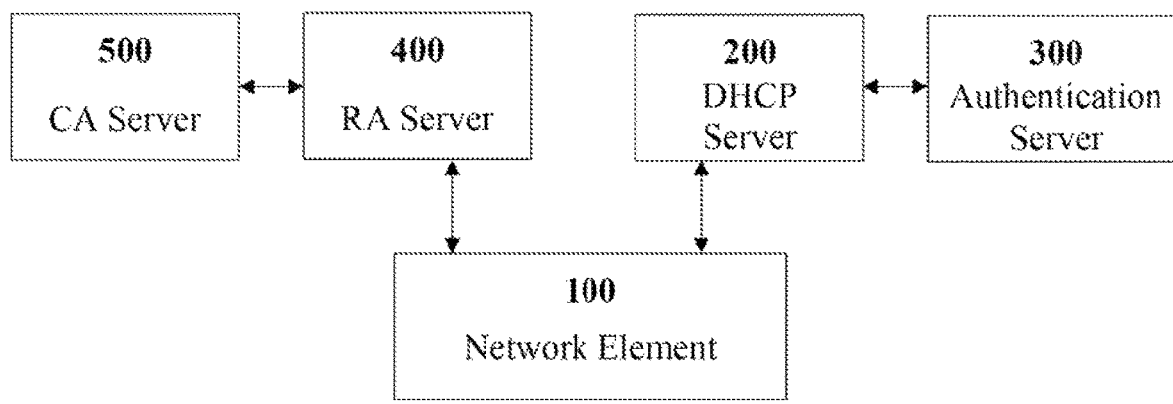
FIG. 1 is a block diagram of a system for performing fully automated certificate enrollment for non-virtual machine (VM) based network elements of a mobile communications network, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code.—It is being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a zero-trust, automated mutual authentication of network elements (NEs) in a radio access network (RAN). In this regard, zero-trust refers to a principle of "never trust, always verify," while mutual authentication refers to authenticating two entities with each other to set up a secure connection therebetween. For example, according to embodiments, any time a NE (e.g., a radio unit (RU), centralized unit (CU), distribution unit (DU), etc.) would like to establish a connection with another NE, both NEs would enroll certificates from a Certificate Authority (CA) server and use the certificates to authenticate each other, thereby securing the connection.

Example embodiments of the present disclosure provide a fully-automated method of enrolling certificates for non-virtual machine (VM) based NEs (e.g., hardware-based physical NEs) and a system for performing the same, said method including: using a Dynamic Host Configuration Protocol (DHCP) server and an Authentication server to authenticate the NE and to provide information of a Certificate Authority (CA) server (such that the NE can generate a certificate signing request (CSR) and send the CSR to the CA server based on the provided information), using a Registration Authority (RA) server such as an Enrollment over Secure Transport (EST) server to assign a profile identifier (ID) to the CSR and to forward the CSR along with the profile ID to the CA server (so as to secure the connection between the NE and the CA server), and using the CA server to map a policy corresponding to the CSR based on the profile ID and to generate or obtain a certificate based on the determined policy. Because the enrollment is fully-automated in example embodiments, a user need not manually provide information (e.g., information on the CA server, policy information, CSR parameters, etc.) to enroll the certificate (e.g., at the time of enrolling, re-enrolling, or renewing the certificate), thereby reducing a burden on network operators as well as the risk of information leakage (e.g., due to human error).

Example embodiments of the present disclosure provide a semi-automated method of enrolling certificates for non-VM based NEs and a system for performing the same, said method including: using a Certificate Lifecycle Management System (CLMS) to allow a user to input a CSR for a non-VM based NE via a graphical user interface (GUI) and to enroll the CSR to a CA server; and using the CA server to assign a policy ID and map a policy corresponding to the CSR based on the policy ID, and to generate a certificate based thereon and send the same to the CLMS. According to example embodiments, a user can then download the certificate to the non-VM based NE via the CLMS. Further, according to example embodiments, a user can use the GUI of the CLMS to select a CA server via which the certificate will be enrolled.

In one or more example embodiments, the system and method for semi-automated enrollment of certificates may be provided in addition to the fully-automated method described above. As a result, example embodiments allow NEs which do not support certificate auto-enrollment to be deployed along with NEs that do support certificate auto-enrollment, thereby allowing greater flexibility in configuring a network system (i.e., allowing the network system to support more types of NEs from the same or different vendors). Additionally, by including the CLMS and the semi-automated method for enrolling certificates, example embodiments provide a fallback or backup certificate enrollment process in situations where auto-enrollment or auto-renewal cannot be performed (e.g., DHCP failure, Authentication Server failure, RA server failure, etc.). As a result, network stability is improved and the impact of a system component's failure is reduced.

Example embodiments of the present disclosure provide a system and method of enrolling certificates for non-VM based NEs, that uses an Authentication server distinct from a DHCP server to authenticate a NE (e.g., verify the NE's security parameters included with a DHCP request). As a result, in one or more example embodiments, the DHCP server does not need to store the parameters for the authentication or verification process (e.g., vendor's certificates, etc.), thereby reducing the load of the DHCP server. Further, since the DHCP server does not need to store the authentication or verification parameters, one DHCP server can provide CA information to multiple NEs from different vendors and/or of different types (e.g., O-RU, subscriber terminal unit (STU), radio interface unit (RIU), etc.). For example, in an O-RAN based telecommunications system according to example embodiments, NEs from a large number of vendors may be included. In order to authenticate all the NEs, a large amount of corresponding authentication information (e.g., vendor certificates, etc.) would need to be pre-installed. If such information were stored in the DHCP server, the load of the DHCP server would be increased (i.e., more data storage and processing power would be used), as would the cost. By offloading the authentication to a distinct authentication server in one or more embodiments, scalabilty of the system improves and load on the DHCP server is reduced.

According to example embodiments, systems and methods are provided that assign a profile ID to each CSR, map a corresponding policy to the profile ID, and generate a certificate based on the policy. Since the CA server generates certificates based on corresponding policies, the system is able to support operator (e.g., telco or mobile network operator) certificate enrollment for multiple types of NEs (where different types of NEs would have different policies) using one CA server. By using one CA server (or reducing the number of CA servers), implementation cost and network construction time are reduced, as well as overall network power consumption (in view of the reduced number of CA servers).

FIG. 1 is a block diagram of a system for performing fully automated certificate enrollment for non-VM based network elements of a mobile communications network, according to one or more embodiments. Referring to FIG. 1, the system includes a network element 100, a DHCP server 200, an Authentication server 300, a Registration Authority (RA) server 400, and a Certificate Authority (CA) server 500.

The network element (NE) 100 may be any network element included in the mobile communications (i.e., telecommunications) network (e.g., 5th Generation (5G) mobile network, Long-Term Evolution (LTE) network, etc.). For example, the NE 100 may be an RU, a STU, a RIU, etc. Further, the network may be an Open RAN (O-RAN) based network, and the NE 100 may be an O-RAN based NE (e.g., an O-RU, etc.). To this end, the NE 100 may be any of plural types and from any of plural vendors. As will be described in further detail below, the NE 100 is configured to obtain information (e.g., address, etc.) of the CA server 500 from the DHCP server 200, generate a certificate signing request (CSR), send the certificate signing request toward the CA server 500 based on the obtained information, and receive a certificate generated by the CA server 500 based on the CSR. Using the certificate, the NE 100 may perform secure communication in the network, e.g., with another non-VM based NE or a VM-based NE (such as CU, DU, etc.).

The DHCP server 200 is configured to provide and assign an Internet Protocol (IP) address to the NE 100 and to provide the information of the CA server 500 to the NE 100. Here, the DHCP server 200 provides the IP address and the information of the CA server 500 based on the NE 100 being verified and/or authenticated by the Authentication server 300. The information of the CA server 500 may include at least one of identification information of the CA server 500 (e.g., fully qualified domain name (FQDN)), an address of the CA server (e.g., IP address), and a security parameter for the CA server 500 (e.g., root certificate of CA server 500).

The Authentication server 300 is configured to authenticate the NE 100. Further, the Authentication server 300 includes a storage that stores security parameters for authenticating or verifying the NE 100. For example, vendor certificates (or third-party certificates) for a plurality of vendors of Network Elements in the mobile communications network are pre-installed in the Authentication server 300. In this case, the Authentication server 300 receives security parameters from the NE 100 (e.g., the NE's vendor device certificate, signed parameter such as serial number and/or nonce, vendor identifier, etc.), and checks whether the received security parameters are correct using the NE vendor's certificate pre-installed therein. Here, the security parameters may be transmitted by the NE 100 to the DHCP server 200 with a DHCP request (e.g., DHCPv6 Request message). Additionally, according to one or more example embodiments, one or more operator certificates (e.g., root certificate from the network operator's root CA) different from the certificate being enrolled by the NE 100 (e.g., intermediate certificate) may be pre-installed in the Authentication server 300 in addition to (or instead of) the vender certificates. In this case, the Authentication server 300 can authenticate the NE 100 using either an operator device certificate (e.g., root certificate previously issued to NE 100 from operator's root CA) or a vender (or third-party) device certificate (e.g., device certificate pre-installed or previously issued to NE 100 from NE vendor's CA) received from the NE 100.

The RA server 400 is configured to receive the CSR from the NE 100, authenticate or validate the NE 100, and forward the CSR to the CA server 500. For example, the RA server 400 may validate the NE 100 based on information included in or with the CSR (e.g., vendor certificate, third-party certificate, operator root certificate, etc.) and information preinstalled in the RA server 400 (e.g., vendor certificate, third-party certificate, operator root certificate, etc.). According to example embodiments, the RA server 400 may be an EST server that establishes a secured connection between the NE 100 and the CA server 500 based on the EST protocol (i.e., as defined in RFC 7030). For example, the NE 100 may send a vendor certificate (i.e., certificate issued by NE vendor's CA) with the CSR and/or in response to a Transport Layer Security (TLS) certificate request message to the EST server, and the EST server will verify the vendor certificate and authorize the CSR accordingly. It is understood that the EST server is merely an example, and one or more other embodiments are not limited thereto. For example, the RA server 400 in various other embodiments may implement a different security protocol for certificate provisioning, including without limitation Simple Certificate Enrollment Protocol (SCEP), Certificate Management Protocol (CMP), Certificate Management over Cryptographic Message Syntax (CMC), etc.

Further, according to example embodiments, the RA server 400 (e.g., EST server) is configured to assign or map a profile ID to the CSR, and forward the CSR (i.e., authorized CSR) and (e.g., together with) the profile ID to the CA server 500. The RA server 400 may be previously configured with correspondences between a plurality of NEs in the network and a plurality of profile IDs. For example, the RA server 400 may include or store a list or mapping of profile IDs to at least one of NE device types (e.g., RU, CU, DU, etc.), preinstalled vendor certificates, vendor identifications, NE device identifiers (e.g., serial number), etc. By way of example, the RA server 400 may include a list of preinstalled vendor certificates, each of which has a corresponding profile ID. By way of another example, the RA server 400 may include a list of devices (NEs) or device types to be enrolled to the CA server 500, each of which has a corresponding profile ID previously assigned thereto. Here, the profile IDs may be manually assigned by a user (e.g., a system administrator) when there is a new device that is to be enrolled to the CA server 500 or installed in the network. Specifically, when a new device is to be enrolled to the CA server 500 in order to obtain certificates, a user may assign a profile ID for that device and configure a corresponding policy for that device/profile ID in the CA server 500 (e.g., may define a key usage, a key validity period, etc.). The profile ID may be uniquely assigned to that NE 100 (e.g., NE serial number), or may be the same profile ID assigned to other NEs (e.g., other NEs of the same at least one of type, purpose, vendor, etc.). In the latter case, a new policy would not need to be configured for the NE, as it would already be set for that profile ID. Additionally, in one or more embodiments, the corresponding policy may be previously configured and set in the CA server 500 for a range of profile IDs (both assigned and unassigned), e.g., a particular policy for a particular type of NE (such as RU or STU) may be preconfigured for a range of profile IDs that correspond to that type of NE (e.g., 6000-6999 for RUs, 7000-7999 for STUs, etc.). In this case, upon assigning a unique profile ID to the device (e.g., a new RU to be added to the network), the corresponding policy need not be configured at that time as it is already pre-configured and mapped to a range of profile IDs including the newly-assigned profile ID.

The CA server 500 is configured to receive the CSR from the RA server 400, generate a certificate based on the CSR, and provide the certificate to the NE 100 (i.e., via the RA server 400). According to example embodiments, the CA server 500 is configured to receive the CSR and the profile ID from the RA server 400 (e.g., EST server), and map a corresponding policy (i.e., predetermined or predefined policy) to the CSR according to the profile ID. The CA server may store a list of profile IDs (i.e., previously set profile IDs), each of which corresponds to a specific NE (e.g., NE serial number), a specific type of NE, a particular vendor, etc. For example, a first ID or a first set of IDs (e.g., "6xxx") correspond to a first type of NE (e.g., RUs), a second ID or a second set of IDs (e.g., "7xxx") correspond to a second type of NE (e.g., STUs), etc. The CA server 500 may also store a plurality of policies, each of which corresponds to a profile ID or to a type of NE. The policies may be preconfigured by a user (e.g., administrator) via a graphical user interface that includes various user input fields (e.g., validity period and validity period options, key usage, revocation parameters, etc.) for defining the policy. The CA server 500 may then determine the policy corresponding to the profile ID for the CSR, and generate the certificate in accordance with the determined policy. In this case, the generated certificate may include the key usage, validity period, etc., such that the certificate will only allow the NE 100 to perform the specified usage within the validity period.

As set forth above, the policies include information for configuring or generating a certificate, such as at least one of a subject name format (C, O, CN fields), a key usage (e.g., digital signature, key certificate signing, certificate revocation list signing, etc.), an extended key usage, a validity period, revocation information etc. The policies may be defined based on NE type (e.g., a default or standard validity period for an RU may be 6 months, and a default or standard validity period for a non-RU device may be 3 years), though it is understood that one or more other embodiments are not limited thereto and the policies may be defined in accordance with a user's (e.g., administrator's) desires, needs, etc. For example, a particular policy may be configured by a user with a relatively short validity period for a NE (i.e., profile ID of NE) that is being tested or test for certificate renewal.

Figure 2:
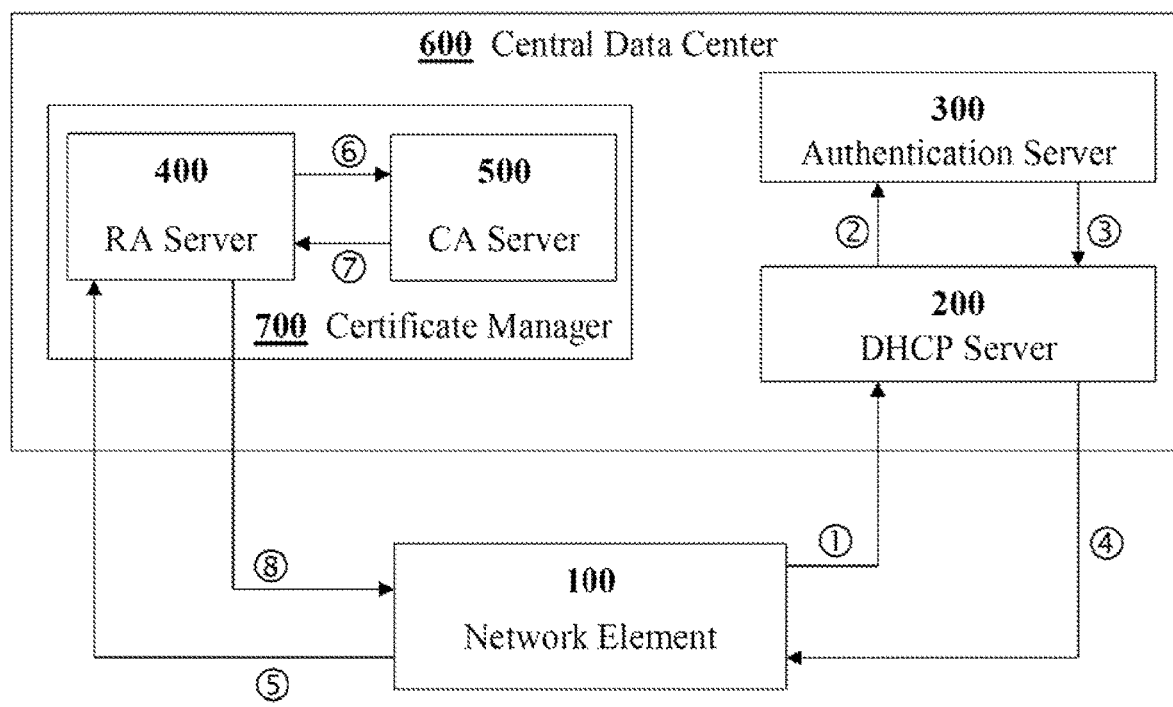
FIG. 2 is a diagram of a system architecture including a communication flow for performing fully automated certificate enrollment for non-VM based network elements of a mobile communications network, according to one or more embodiments.

FIG. 2 is a diagram of a system architecture including a communication flow for performing fully automated certificate enrollment for non-VM based network elements of a mobile communications network, according to one or more embodiments. Referring to FIG. 2, the system architecture includes a NE 100 and a central data center (CDC) 600. The CDC 700 may be a data center of an operator of the mobile communications network or telco, and includes a DHCP server 200, an Authentication server 300, and a certificate manager (CM) 700. It is understood that this is merely an example, and in other embodiments, at least some of the various devices may be distributed across multiple locations or data centers. The CM 700 includes an RA server 400 (e.g., EST server) and a CA server 500 (e.g., mobile network operator's CA server). The NE 100, DHCP server 200, Authentication server 300, RA server 400 and CA server 500 may be the same as or substantially similar to those described above with reference to FIG. 1, and redundant descriptions thereof may not be repeated below.

Referring to FIG. 2, at ①, the NE 100 sends a request (e.g., DHCP Request) to the DHCP server 200. The NE 100 sends the request in order to acquire an IP address and CA information from the DHCP server 200. The request may include at least one of identification information on a vendor of the NE 100, a serial number of the NE 100, an NE device certificate, a signed serial number, a signed nonce, etc. Here, the NE device certificate may be the NE's vendor device certificate (or vendor CA certificate) pre-installed in the NE 100, or an operator (e.g., mobile network operator or telco) device certificate (or operator CA certificate) that the NE 100 already has (e.g., root CA certificate). Further, the nonce may be previously received by the NE 100 from the DHCP server 200.

At ②, the DHCP server 200 sends (or forwards) security parameters of the NE 100 to the Authentication server 300 for verification and authentication. The security parameters may include at least one of the received serial number of the NE 100, the received NE device certificate, the received signed serial number, the received signed nonce, the nonce itself, etc.

The Authentication server 300 verifies and authenticates the received security parameters. For example, the Authentication server 300 verifies that the NE device certificate, the signed serial number, and the signed nonce are correct, using the corresponding vendor or operator certificate pre-installed therein, the received serial number, and the received nonce, respectively. At ③, the Authentication server 300 sends a result (e.g., success response or fail response) of the authentication and verification to the DHCP server 200.

At ④, based on the result of the authentication and verification indicating a successful authentication/verification, the DHCP server 200 generates and sends a message (e.g., DHCP Response message) to the NE 100, the message including the NE's IP address and information of the CA server 500 (e.g., FQDN/IP, Port). The message may also include Domain Name System (DNS) information, an operator CA root certificate, etc. In one or more example embodiments, a Top-of-Rack (TOR) switch or Transport Network Equipment (TNE) may be included in the communication path between the DHCP server 200 and the NE 100 and may forward messages therebetween.

At ⑤, the NE 100 sends a CSR and a device certificate (e.g., pre-installed vendor certificate) to the CM 700 based on the received information of the CA server 500. Here, the CSR generated by the NE 100 may include a public key (e.g., a public key generated by NE 100 to be included in the requested certificate), a common name field (e.g., device's hostname), and an organization name field (e.g., the mobile network operator's name), and may be signed with a private key corresponding to the included public key. The CSR and device certificate may be transmitted in an HTTP Request message.

The CSR and device certificate are received by the RA server 400 (e.g., EST server), which validates the NE 100. For example, the RA server 400 validates the NE 100 using the received device certificate and a corresponding device certificate (e.g., vendor certificate) pre-installed therein. The RA server 400 also assigns or maps a corresponding profile ID to the NE 100/CSR, as described above, and sends (or forwards) the CSR along with the profile ID to the CA server 500 at ⑥.

The CA server 500 receives the CSR along with the profile ID from the RA server 400, and determines a policy (e.g., previously configured policy) for the CSR based on the profile ID, as described above. The CA server 500 generates the certificate based on the CSR and the determined policy. The certificate may be formatted in accordance with a predefined standard, such as X.509. At ⑦, the CA server 500 sends the certificate to the RA server 400, which in turn sends it to the NE 100 at ⑧. The RA server 400 may send the certificate (e.g., CA signed device certificate) to the NE 100 in an HTTP Response message.

Figure 3:
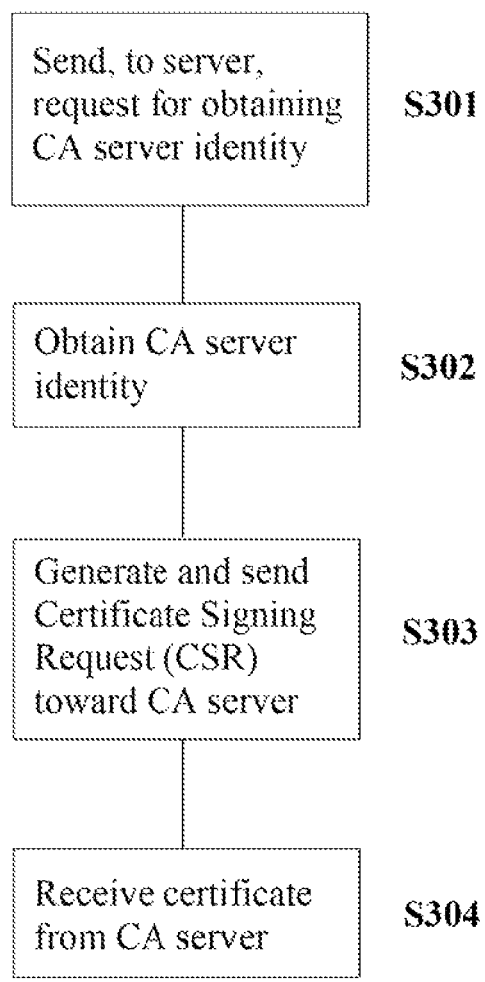
FIG. 3 is a flowchart of a method for performing fully automated certificate enrollment for non-VM based network elements, according to one or more embodiments.

FIG. 3 is a flowchart of a method for performing fully automated certificate enrollment for non-VM based network elements, according to one or more embodiments. The method of FIG. 3 may be performed by the NE 100 described above with reference to FIG. 1 or 2. For example, the method may be performed by at least one processor executing instructions stored in a memory.

Referring to FIG. 3, in operation S301, the NE 100 sends a request (e.g., DHCP request) to a first server (e.g., DHCP server 200) in order to obtain a CA server identity. The request may include at least one of identification information on a vendor of the NE 100, a serial number of the NE 100, an NE device certificate, a signed serial number, a signed nonce, etc. Here, the NE device certificate may be the NE's vendor device certificate (or vendor CA certificate) pre-installed in the NE 100, or an operator (e.g., mobile network operator or telco) device certificate (or operator CA certificate) that the NE 100 already has. Further, the nonce may be previously received by the NE 100 from the first server.

In operation S302, the NE 100 obtains a CA server identity from the server (e.g., DHCP server 200). For example, based on the non-VM NE being authenticated/verified, by the server or an Authorization server 300 communicably connected to the server (e.g., DHCP server 200), according to the NE device certificate, signed serial number, signed nonce, etc., the NE 100 receives the CA server identity (e.g., FQDN/IP, Port) from the server. The NE 100 may also receive an IP address and additional information (e.g., DNS, etc.) from the server.

The NE 100 generates and sends a CSR toward the CA server 500 at operation S303. Here, the CSR may be generated before, after, or concurrently with operation S301 in various embodiments. Further, in operation S303, the NE 100 may send the CSR with at least one security parameter (e.g., a device certificate such as a vendor certificate), in order to be authenticated. For example, the NE 100 may transmit the CSR and security parameter to the RA server 400 (e.g., EST server), which authenticates the NE 100 using the security parameter (and a corresponding security parameter that it possesses) and, in turn, forwards the CSR to the CA server 500.

The CA server 500 generates a certificate based on the CSR and, in operation S304, the NE 100 receives the generated certificate.

Figure 4:
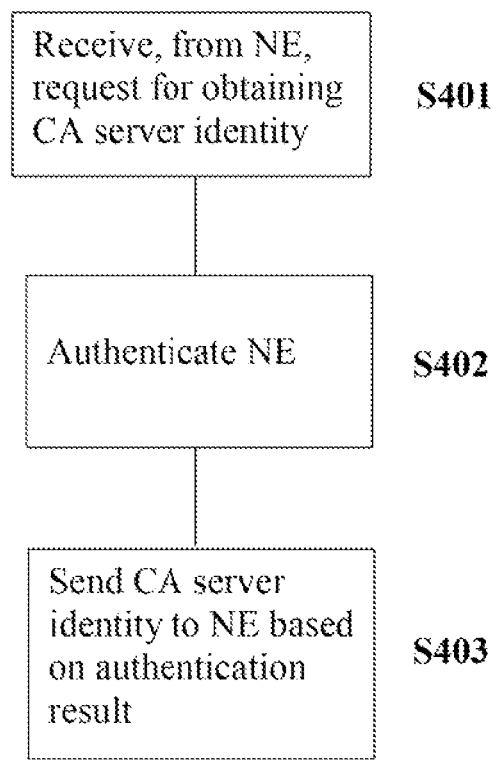
FIG. 4 is a flowchart of a method of providing a CA server identity to a non-VM NE according to one or more embodiments.

FIG. 4 is a flowchart of a method of providing a CA server identity to a non-VM NE according to one or more embodiments. The method of FIG. 4 may be performed by the DHCP server 200 described above with reference to FIG. 1 or 2, and may be performed in response to operation S301 in FIG. 3. For example, the method may be performed by at least one processor executing instructions stored in a memory.

Referring to FIG. 4, at operation S401, a server (e.g., DHCP server 200) receives a request for obtaining CA information (e.g., CA server identity) from a NE 100. The request may also be for receiving an IP address. The request may include at least one of identification information on a vendor of the NE 100, a serial number of the NE 100, an NE device certificate, a signed serial number, a signed nonce, etc. The nonce may be previously transmitted by the server to the NE 100 (e.g., in response to an initial message).

At operation S402, the server authenticates the NE 100 (e.g., determines whether NE 100 is authentic). For example, the server (e.g., DHCP server 200) may transmit one or more security parameters (e.g., received serial number, received NE device certificate, received signed serial number, received signed nonce, and nonce) to another server (e.g., Authentication server 300) which verifies the one or more security parameters (e.g., using a corresponding pre-installed certificate) and returns a result (e.g., success or fail) of the verification to the server. Alternatively, the server may directly authenticate the NE 100 itself (i.e., verify the one or more security parameters itself).

At operation S403, the server sends the CA server identity (e.g., FQDN/IP, Port) to the NE 100 based on the authentication/verification result. The server may also assign and send an IP address and additional information (e.g., DNS, etc.) to the NE 100 in operation S403.

Figure 5:
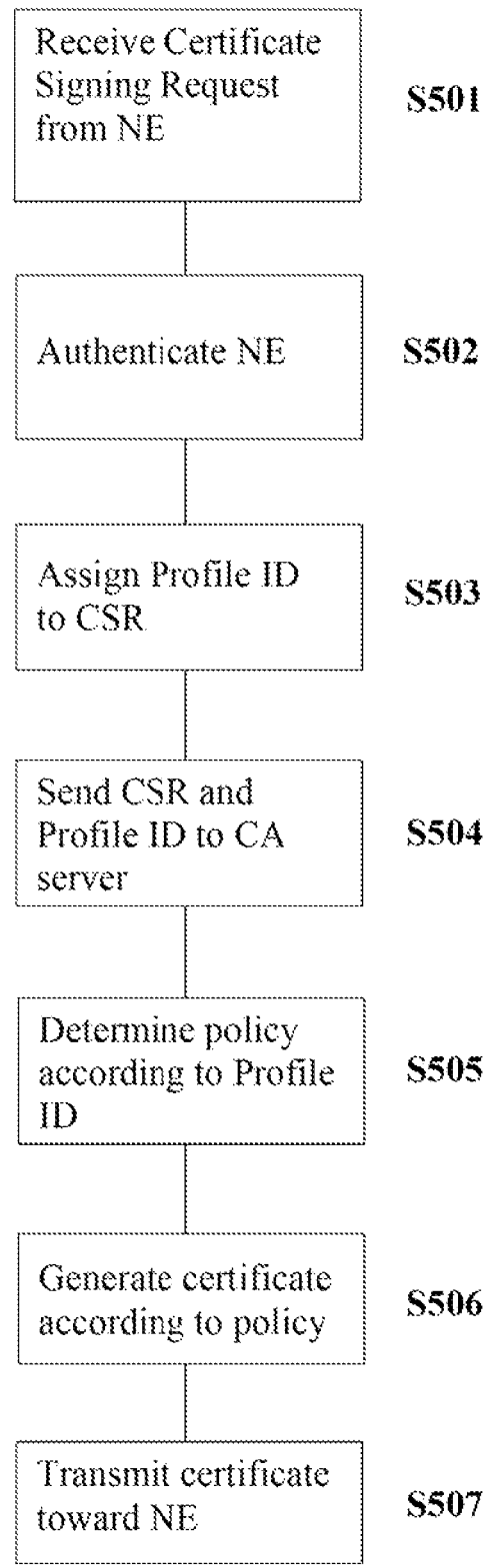
FIG. 5 is a flowchart of a method of generating a certificate according to one or more embodiments.

FIG. 5 is a flowchart of a method of generating a certificate according to one or more embodiments. The method of FIG. 5 may be performed by the CM 700 described above with reference to FIG. 2, and may be performed in response to operation S303 in FIG. 3. For example, the method may be performed by at least one processor executing instructions stored in a memory.

Referring to FIG. 5, in operation S501, a first server (e.g., RA server 400) receives a CSR from a NE 100. The CSR may include a public key (e.g., a public key generated by NE 100 to be included in the requested certificate), a common name field (e.g., device's hostname), and an organization name field (e.g., the mobile network operator's name), and may be signed with a private key corresponding to the included public key. The first server may also receive a device certificate (e.g., NE's vendor certificate) from the NE 100 in operation S501.

In operation S502, the first server authenticates the NE 100. For example, the first server may authenticate the NE 100 in accordance with a predefined protocol (e.g., EST protocol, SCEP, CMP, CMC protocol, etc.). To this end, a certificate corresponding to the device certificate received from the NE 100 may be pre-installed in the first server and used to verify the device certificate.

In operation S503, the first server maps or assigns a profile ID to the CSR 100. For example, the first server (e.g., RA server 400) may be previously configured with correspondences between a plurality of NEs in the network and a plurality of profile IDs. For example, the first server may include or store a list or mapping of profile IDs to at least one of NE device types (e.g., RU, CU, DU, etc.), preinstalled vendor certificates, vendor identifications, NE device identifiers, etc. By way of example, the first server may include a list of preinstalled vendor certificates, each of which has a corresponding profile ID. By way of another example, the first server may include a list of devices (NEs) or device types to be enrolled to the CA server 500, each of which has a corresponding profile ID previously assigned thereto.

In operation S504, the first server sends the CSR with the profile ID to a second server (i.e., the CA server 500).

In operation S505, the second server determines or maps a corresponding policy to the CSR according to the profile ID. Here, the policy is preconfigured and set in the second server, and includes information for configuring the certificate (e.g., at least one of a subject name format (C, O, CN fields), a key usage, an extended key usage, a validity period, etc.). For example, in operation S505, the second server may determine a device type of the NE 100 according to the profile ID, and may determine the preconfigured policy based on the device type.

In operation S506, the second server generates a certificate based on the CSR and the determined policy. The certificate may be formatted in accordance with a predefined standard, such as X.509, and may have values (e.g., validity period, key usage, etc.) based on the determined policy.

In operation S507, the second server (e.g., CA server 500) transmits the certificate toward the NE 100. For example, the second server may send the certificate to the first server (e.g., RA server 400), which in turn forwards it to the NE 100 (or to another device, e.g., TOR switch or TNE, which then sends it to the NE 100).

It is understood that the methods of FIGS. 3 through 5 may be performed automatically, i.e., without manual inputs or human intervention needed at the time of certificate enrollment (or re-enrollment, renewal, etc.).

Figure 6:
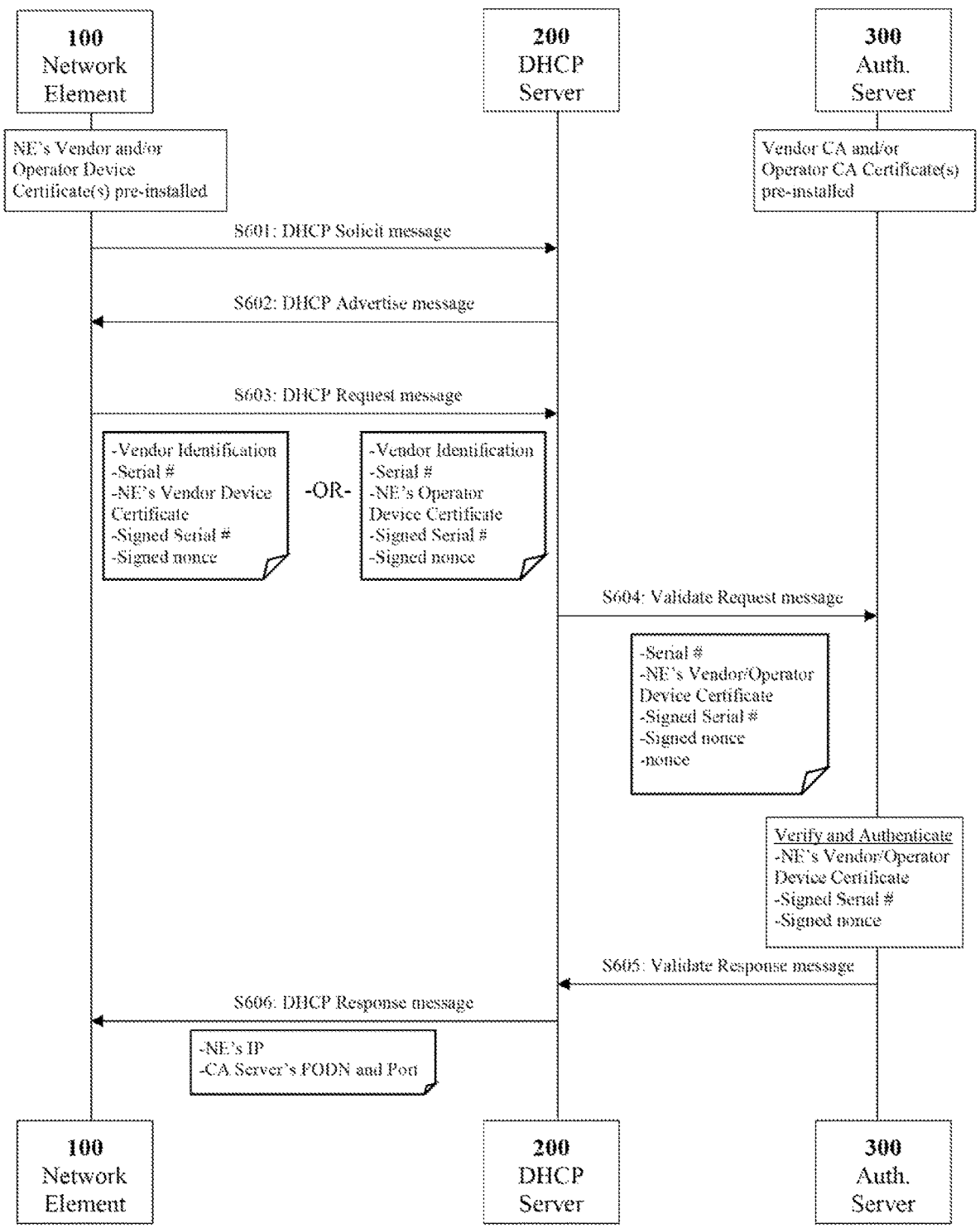
FIG. 6 is a message flow diagram for obtaining a CA server identity according to one or more embodiments.

FIG. 6 is a message flow diagram for obtaining a CA server identity according to an embodiment. The message flow diagram of FIG. 6 includes messages transmitted between a NE 100, DHCP server 200, and Authentication server 300, such as those described above with reference to FIG. 1. It is understood that one or more other embodiments are not limited to the message flow and system devices shown in FIG. 6. For example, in one or more other embodiments, a TOR switch or other TNE may be included between at least two of the devices (e.g., between the NE 100 and the DHCP server 200).

Referring to FIG. 6, at S601, the NE 100 sends a DHCP Solicit message to the DHCP server 200. In response, at S602, the DHCP server 200 transmits a nonce in a DHCP Advertise message to the NE 100. Here, the nonce may be generated by the DHCP server 100 (e.g., for a one-time use), for example, in response to receiving the DHCP Solicit message. The NE 100 generates and sends a DHCP Request message to the DHCP server 200 at S603, the DHCP Request message including vendor information, the NE's serial number, the NE's device certificate, the signed serial number, and the signed nonce. Here, the DHCP Request message may either include the NE's vendor device certificate pre-installed in the NE 100 (which may be referred to as an invalid operator device certificate), or an operator (e.g., mobile network operator or telco) device certificate (or operator CA certificate) that the NE 100 already has (which may be referred to as a valid operator device certificate), e.g., a root certificate from the operator's CA. The DHCP server 200 sends the security parameters (serial number, device certificate, signed serial number, signed nonce, and nonce) in a Validate Request message to the Authentication server 300 at S604. The Authentication server 300 verifies the device certificate using a corresponding vendor or operator CA certificate pre-installed therein, and verifies the signed serial number and signed nonce. Based on the verification, the Authentication server 300 transmits a Validate Response message indicating success or fail to the DHCP server 200 at S605. Based on the Validate Response message indicating success, the DHCP server 200 sends a DHCP Response to the NE 100 at S606. The DHCP Response received by the NE 100 includes the NE's IP address and the CA Server's information (e.g., the CA Server's FQDN, Port, and/or IP). Further, the DHCP Response may include additional information, such as at least one of the operator CA root certificate, DNS and other details, etc.

Figure 7:
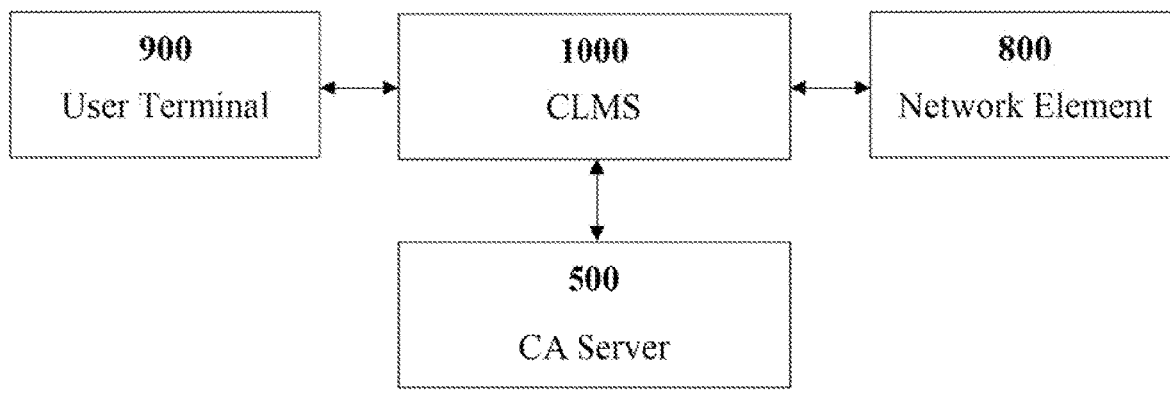
FIG. 7 is a block diagram of a system for performing semi-automated certificate enrollment for non-virtual machine (VM) based network elements of a mobile communications network, according to one or more embodiments.

FIG. 7 is a block diagram of a system for performing semi-automated certificate enrollment for non-virtual machine (VM) based network elements of a mobile communications network, according to one or more embodiments. Referring to FIG. 7, the system includes a network element (NE) 800, a user terminal 900, a Certificate Lifecycle Management System (CLMS) 1000, and a Certificate Authority (CA) server 500.

The NE 800 may be any network element included in the mobile communications (i.e., telecommunications) network (e.g., 5G mobile network, LTE network, etc.). For example, the NE 800 may be an RU, a STU, a RIU, etc. Further, the network may be an Open RAN (O-RAN) based network, and the NE 800 may be an O-RAN based NE (e.g., an O-RU, etc.). To this end, the NE 800 may be any of plural types and from any of plural vendors. The NE 800 is configured to connect to the CLMS 1000, generate and upload a CSR to the CLMS 1000, and download and install a certificate (e.g., mobile network or telco operator device certificate) (e.g., address, etc.) of the CA server 500 obtained via the CLMS 1000. The CSR may be input by a user (e.g., owner of the NE 800, system or network administrator, etc.) to a graphical user interface (GUI) provided by the CLMS for certificate enrollment. For example, the user may select a CA server (e.g., one of plural intermediate CAs for respectively signing or enrolling certificates of different types of NEs in the network) for enrolling the CSR via the GUI. The NE 800 may or may not support the fully-automated certificate enrollment as described above with reference to FIGS. 1-6. In one or more embodiments, the NE 800 may be unable to obtain the certificate via the fully-automated method described above with reference to FIGS. 1-6 (e.g., the NE 800 may not support fully-automated certificate enrollment, a component of the system for performing the full-automated certificate may experience a failure, etc.). Alternatively or additionally, the system itself may not support the fully-automated certificate enrollment or may itself be specifically configured for semi-automated certificate enrollment according to an embodiment of the present disclosure.

The user terminal 900 is configured to connect to the CLMS 1000 and receive and display a graphical user interface of the CLMS 1000. Further, the user terminal 900 includes an input device (e.g., at least one of keyboard, mouse, touch screen, etc.) through which a user may provide inputs to the user interface of the CLMS 1000. Specifically, the user terminal 900 may be configured to allow a user (e.g., administrator) to approve or deny a CSR uploaded by the network element 800 and to manage one or more parts of the lifecycle of certificates deployed across the network (e.g. O-RAN). For example, the user may manually revoke a certificate, modify a parameter or field of a certificate, view dashboards or information regarding deployed certificates, etc., via the graphical user interface of the CLMS 1000 displayed on the user terminal 900. The user terminal 900 may be any computing device (e.g., personal computer, laptop computer, workstation, mobile device, etc.).

The CLMS 1000 is a system (e.g., one or more servers or computing devices) for enrolling and managing the lifecycle of CA certificates in a network. As described above, the CLMS 1000 provides a GUI for certificate enrollment through which the NE 800 can upload a CSR. For example, a user (e.g., owner of the NE 800, administrator, etc.) may select a CA server via the GUI for certificate enrollment. Additionally, the CLMS 1000 may provide a GUI to a user terminal to allow a user (e.g., administrator) to approve or deny CSRs that have been uploaded or input to the CLMS 1000, view dashboards and information on certificates deployed throughout the network, and manage the lifecycles of deployed certificates. Additionally, the CLMS 1000 may check any CSR for compliance with a particular policy, e.g., an approved cryptography policy of the telco or mobile communications network operator, perform automatic certificate renewal, etc.

The CLMS 1000 is communicatively coupled or connected to the CA server 500 via an application programming interface (API), such as a Representational State Transfer (REST or RESTful) API, and submits or sends the CSR uploaded by the NE 800 to the CA server 500. Further, the CLMS 1000 may be configured to receive a notification from the CA server 500 when the certificate is ready to be downloaded, notify the user (e.g., owner of the NE 800 or administrator) that the certificate is ready to be downloaded, receive the certificate from the CA server 500, and allow the user to download the certificate to the NE 800.

The CA server 500 is configured to receive the CSR generated by the NE 800 from the CLMS 1000, determine a previously set (e.g., by a user) profile ID for the CSR (e.g., based on the NE 800 type or vendor), determine a corresponding policy mapped to the profile ID as discussed above with reference to FIGS. 1 and 2, and generate the certificate according to the CSR and the policy. Further, the CA server 500 is configured to send the certificate to the CLMS 1000 through which a user can download the certificate to the NE 800. In one or more embodiments, the CA server 500 may be further configured to send a notification to the CLMS to notify the user that the certificate is ready to be downloaded.

Figure 8:
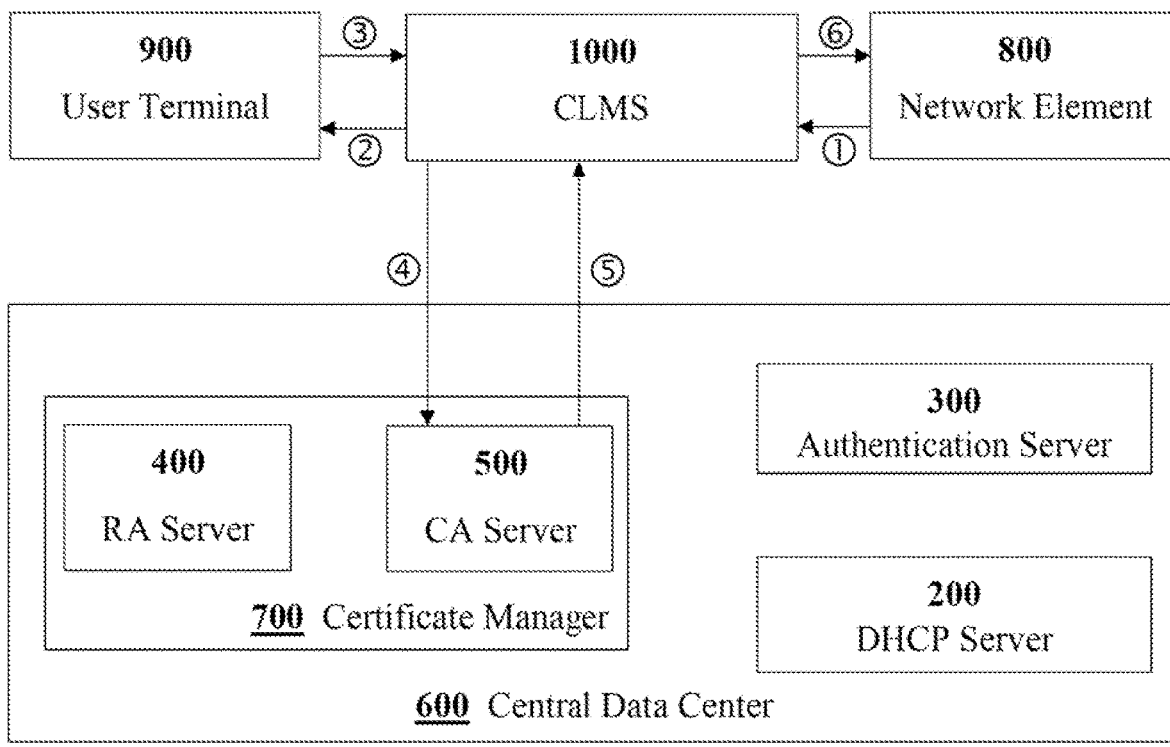
FIG. 8 is a diagram of a system architecture including a communication flow for performing semi-automated certificate enrollment for non-VM based network elements of a mobile communications network, according to one or more embodiments.

FIG. 8 is a diagram of a system architecture including a communication flow for performing semi-automated certificate enrollment for non-VM based network elements of a mobile communications network, according to one or more embodiments. The system illustrated in FIG. 8 includes the components for supporting fully-automated enrollment, described above with reference to FIGS. 1-6, in addition to the CLMS 1000. Thus, in the present embodiment, the system supports both fully-automated certificate enrollment and semi-automated certificate enrollment (e.g., as a backup or fallback enrollment where the fully-automated enrollment cannot be performed for a NE 800), though it is understood that one or more other embodiments are not limited thereto.

Referring to FIG. 8, at ①, the NE 800 generates and uploads a CSR to the CLMS 1000. For example, an authorized user (e.g., owner of the NE 800, system or network administrator, etc.) may select the CA server 500 from among plural available CA servers (e.g., CA servers such as intermediate CA servers for enrolling certificates based on NE device type) via a GUI of the CLMS, and the NE 800 may generate and upload the CSR to the CLMS 1000 for enrolling with the selected CA server. For example, a user (e.g., system administrator, management user, etc.) may utilize a user terminal to log in to or access the NE 800 remotely and generate and submit the CSR from the NE 800. Additionally or alternatively, instructions may be triggered (e.g., by a user directly to the NE 800, by a user remotely, or by occurrence of an event) to execute (e.g., automatically execute) to generate and submit the CSR to the CLMS 1000. For example, instructions or scripts installed in the NE 800 may automatically execute to generate and submit a CSR periodically or in response to an event (e.g., based on a renewal trigger point, such as X days until expiration, defined in the policy for an existing certificate enrolled by the NE 800).

At ②, the CLMS 1000 provides a GUI to the user terminal 900 through which a user (e.g., administrator) may approve or deny the CSR uploaded by the NE 800. At ③, the user terminal 900 submits an approval (or denial) of the CSR based on an input of the user.

At ④, the CLMS 100 sends the approved CSR to the selected CA server 500 via an API (e.g., REST API). The CA server 500 receives the CSR, determines a profile ID previously set for the CSR (or for the NE 800) and determines a corresponding policy that is previously configured as described above. Based on the CSR and the determined policy, the CA server 500 generates a certificate for the NE 800. At ⑤, the CA server 500 sends the certificate to the CLMS 1000 via the API. At ⑥, the certificate is downloaded by the NE 800.

Figure 9:
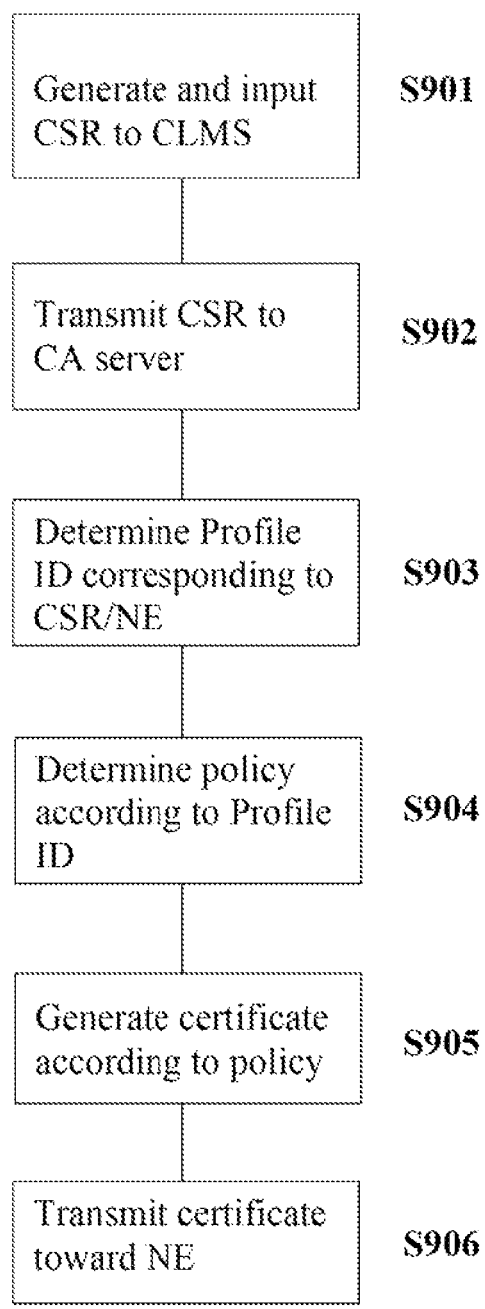
FIG. 9 is a flowchart of a method for performing semi-automated certificate enrollment for non-VM based network elements, according to one or more embodiments.

FIG. 9 is a flowchart of a method for performing semi-automated certificate enrollment for non-VM based network elements, according to one or more embodiments. The method of FIG. 9 may be performed by the system illustrated in FIG. 8 or 9.

Referring to FIG. 9, at operation S901, a CSR is generated and input to the CLMS 1000. For example, the CSR may be input by a user (e.g., owner of the NE 800 or system administrator) via a GUI of the CLMS 1000. Additionally, the user may select or input a particular CA server to which the CSR will be enrolled.

At operation S902, the CSR is sent from the CLMS 1000 to the CA server 500 via an API (e.g., REST API). According to an example embodiment, the CLMS 1000 may send the CSR to the CA server 500 upon at least one of approval by a user (e.g., system administrator) and successful compliance check (e.g., confirming that the CSR complies with a predetermined policy of the network operator).

At operation S903, the CA server 500 determines a preconfigured or set profile ID corresponding to the CSR (or to the NE 800). Here, the profile IDs may be manually assigned by a user (e.g., a system administrator) when there is a new device that is to be enrolled to the CA server 500. Specifically, when a new device is to be enrolled to the CA server 500 in order to obtain certificates, a user may assign a profile ID for that device and configure a corresponding policy for that device/profile ID in the CA server 500 (e.g., may define a validity period for a key usage, a key validity period, etc.). Accordingly, the CA server may store a list of profile IDs (i.e., previously set profile IDs), each of which corresponds to a specific NE (e.g., serial number) a specific type of NE, a vendor of an NE, etc. For example, a first ID or a first set of IDs (e.g., "6xxx") correspond to a first type of NE (e.g., RUs), a second ID or a second set of IDs (e.g., "7xxx") correspond to a second type of NE (e.g., STUs), etc.

At operation S904, the CA server 500 determines a preconfigured policy according to the profile ID. The policies include information for configuring or generating a certificate, such as at least one of a subject name format (C, O, CN fields), a key usage, an extended key usage, a validity period, etc. The policies may be defined based on NE type (e.g., a default or standard validity period for an RU may be 6 months, and a default or standard validity period for a non-RU device may be 3 years), though it is understood that one or more other embodiments are not limited thereto. The CA server 500 may determine the policy corresponding to the profile ID for the CSR, e.g., by determining a device type of the NE 100 according to the profile ID and the preconfigured policy based on the device type.

At operation S905, the CA server 500 generates the certificate in accordance with the determined policy. In this case, the generated certificate may include the key usage, validity period, etc., such that the certificate will only allow the NE 800 to perform the specified usage within the validity period.

At operation S906, the certificate is transmitted to the NE 800 via the CLMS. For example, the CA server 500 may send a notification to the CLMS to notify the user that the certificate is ready to be downloaded, and the user can then use the CLMS to download the certificate and install it in the NE 800.

While the above example embodiments are described with reference to certificate enrollment, it is understood that one, some, or all of the above-described embodiments are also applicable to certificate re-enrollment or renewal. The certificate re-enrollment or renewal may be triggered in one or more embodiments based on a current system date/time crossing a threshold, for example, determined in accordance with the below Equation:

$$\text{certificate issuance data} + \text{renewal threshold} * \text{certificate validity period}$$

For example, using the above equation, if the certificate validity period is 100 days and the renewal threshold is 60%, the certificate renewal is triggered when the current system date reaches or crosses 60 days after the certificate issuance date. It is understood that one or more of the certificate validity period and renewal threshold are configurable by a user (e.g., system administrator) and may vary from one certificate to another, for one NE to another, for one NE device type to another, etc. Further, in one or more embodiments, an alarm or notification (e.g., "operator certificate is expiring in X days") may be generated by a device (e.g., the corresponding NE in which the certificate is enrolled, another NE connected to the NE, the CLMS, etc.) and updated daily (or periodically) until the alarm is cleared (e.g., upon successful renewal of the certificate).

Figure 10:
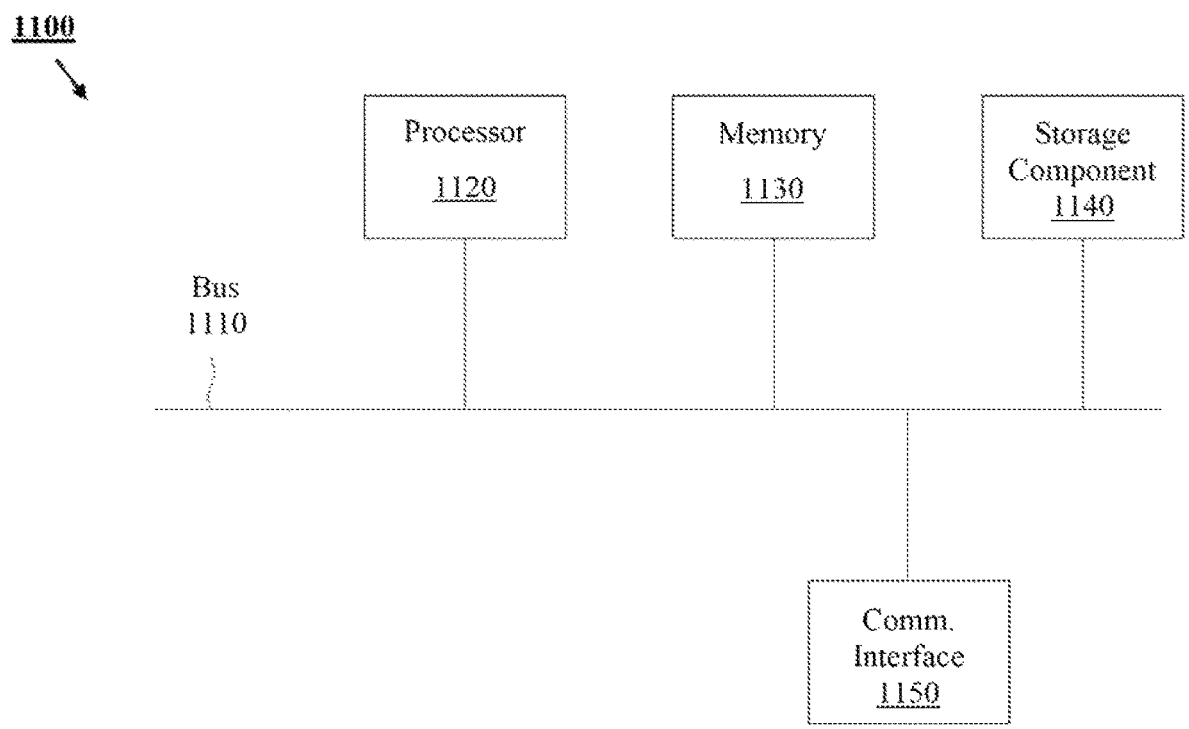
FIG. 10 is a diagram of components of one or more devices according to an embodiment.

FIG. 10 is a diagram of components of one or more devices according to an embodiment.

Device 1100 may correspond to any of the devices described above or below (e.g., network element 100 or 800, DHCP server 200, Authentication server 300, RA server 400, CA server 500, user terminal 900, CLMS 1000, etc.).

As shown in FIG. 10, the device 1100 may include a bus 1110, a processor 1120, a memory 1130, a storage component 1140, and a communication interface 1150. It is understood that one or more of the components may be omitted and/or one or more additional components may be included.

The bus 1110 includes a component that permits communication among the components of the device 1100. The processor 1120 is implemented in hardware, firmware, or a combination of hardware and software. The processor 1120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 1120 includes one or more processors capable of being programmed to perform a function.

The memory 1130 includes a random access memory (RAM), a read only memory (ROM), and/or another type of dynamic or static storage device (e.g., a flash memory, a magnetic memory, and/or an optical memory) that stores information and/or instructions for use by the processor 1120.

The storage component 1140 stores information and/or software related to the operation and use of the device 1100. For example, the storage component 1140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 1150 includes a transceiver-like component (e.g., a transceiver and/or a separate receiver and transmitter) that enables the device 900 to communicate with other devices, such as via a wired connection, a wireless connection, or a combination of wired and wireless connections. The communication interface 1150 may permit device 1100 to receive information from another device and/or provide information to another device. For example, the communication interface 1150 may include an Ethernet interface, an optical interface, a coaxial interface, an infrared interface, a radio frequency (RF) interface, a universal serial bus (USB) interface, a Wi-Fi interface, a cellular network interface, or the like.

The device 1100 may perform one or more processes described herein. The device 1100 may perform operations based on the processor 1120 executing software instructions stored by a non-transitory computer-readable medium, such as the memory 1130 and/or the storage component 1140. A computer-readable medium is defined herein as a non-transitory memory device. A memory device includes memory space within a single physical storage device or memory space spread across multiple physical storage devices.

Software instructions may be read into the memory 1130 and/or the storage component 1140 from another computer-readable medium or from another device via the communication interface 1150. When executed, software instructions stored in the memory 1130 and/or storage component 1140 may cause the processor 1120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

While embodiments described above with reference to FIGS. 1 through 6 authenticate a network element via DHCP authentication, it is understood that one or more other embodiments are not limited thereto. For example, according to another embodiment, a network element may be authenticated in accordance with IEEE 802.1x network access control procedures. To this end, the system may further include an authenticator (e.g., a TOR Switch) and an authentication server in accordance with IEEE 802.1x. The authentication server may support RADIUS and Extensible Authentication Protocol (EAP). In accordance with this embodiment, the network element (e.g., O-RU) that supports 802.1x (supplicant) may initiate EAP over LAN (EAPOL), for example, by transmitting an EAPOL Start message and an EAP Response to the authenticator. The authenticator, in turn, may request authentication from the authentication server via RADIUS/TACACS+. Upon successful authentication, the supplicant may then enroll a certificate with the CA server over EST protocol, such as described above with reference to FIG. 5.

A system for certificate enrollment according to another embodiment may support both DHCP and IEEE 802.1x authentication. In particular, the system may include one or more network elements that do not support 802.1x authentication. An enhanced authentication procedure according to the present embodiment enables network elements (e.g., O-RUs) with and without 802.1x authentication support to coexist in an open fronthaul O-RAN operator network.

Figure 11:
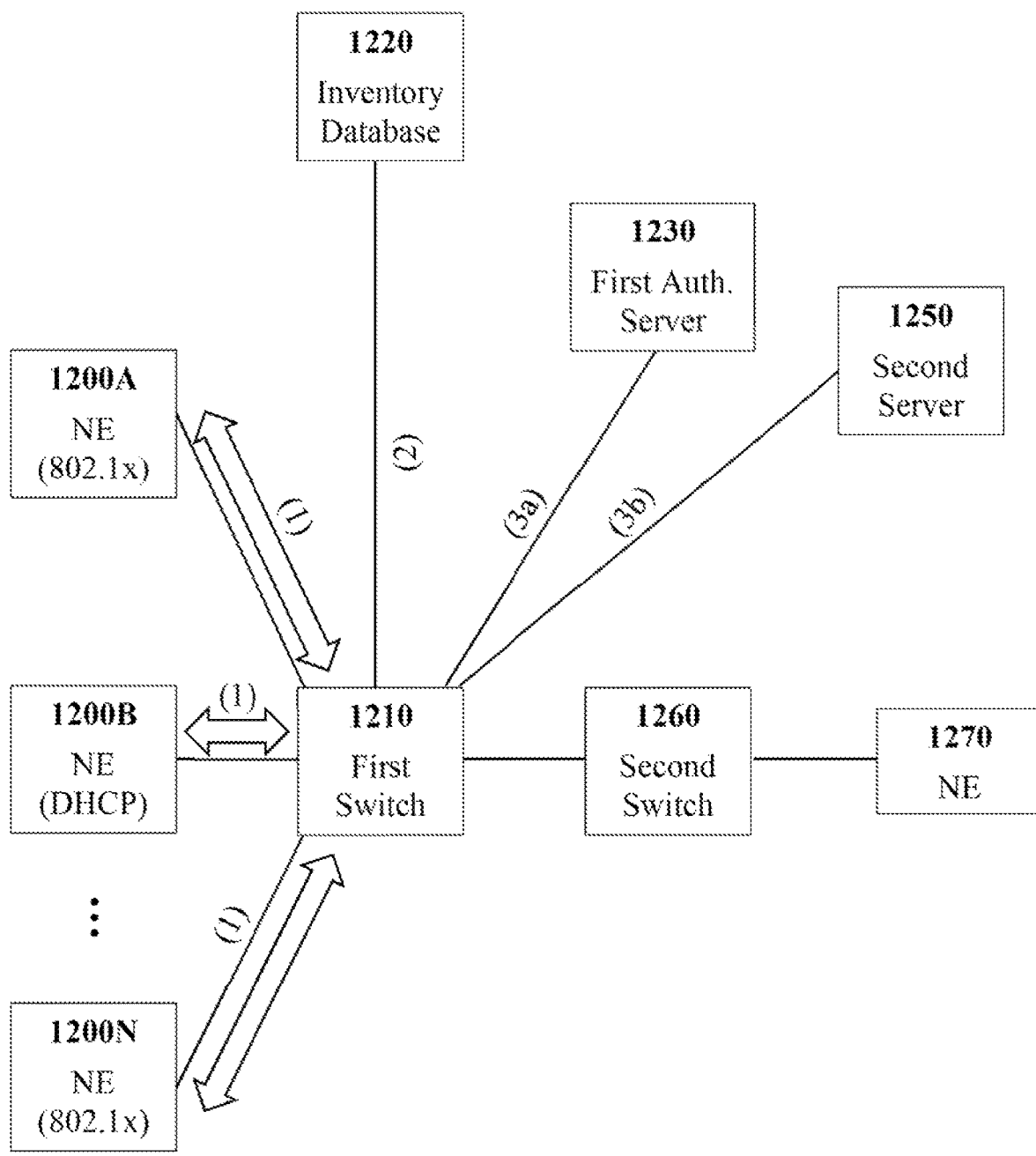
FIG. 11 is a diagram of a system architecture including a communication flow for an enhanced authentication procedure according to one or more embodiments.

FIG. 11 illustrates a system architecture including a communication flow for an enhanced authentication procedure according to one or more embodiments. The system illustrated in FIG. 11 supports authentication according to both a first protocol (e.g., 802.1x) and a second protocol (e.g., DHCP).

Referring to FIG. 11, the system may include a plurality of network elements 1200A, 1200B, . . . 1200N, one or more of which support authentication according to the first protocol and one or more of which support authentication according to the second protocol. The system may further include a first switch 1210 (or a TOR switch, computing device, network access device, TNE, etc.), an inventory database 1220 (or a computing device, storage, etc.), a first authentication server 1230 for performing authentication in accordance with the first protocol, and at least one second server 1250 (e.g., DHCP server and second authentication server) for performing authentication in accordance with the second protocol. The system may further include one or more second switches 1260, and at least one other network element 1270 (e.g., distributed unit (DU) or O-RAN DU (O-DU)) connected to the plurality of network elements 1200A, 1200B, . . . 1200N by the fronthaul CUS plane.

At (1) of the communication flow, a network element 1200A, 1200B, . . . 1200N (e.g., O-RU, STU, RIU, etc.) provides device information to the first switch 1210. For example, a proprietary custom protocol may be enabled respectively in each network element 1200A, 1200B, . . . 1200N to send device information thereof, such as at least one of a vendor name, a model number or identifier, a serial number, etc. The device information may be provided to the first switch 1210 via a Layer 2 (L2) discovery protocol (e.g., Link Layer Discovery Protocol). For example, the device information may be sent to the first switch 120 using type-length-value (TLV) fields in Layer 2 Ethernet frames. One or more of the network elements 1200A, 1200N may support authentication according to the first protocol, e.g., IEEE 802.1x. Further, one or more of the network elements 1200B may support authentication according to the second protocol, e.g., DHCP. The first switch 1210 may be a TOR switch.

At (2) of the communication flow, the first switch 1210 sends the device information to the inventory database 1220 in order to query the inventory database 1220 as to the corresponding network element's authentication capability, that is, to determine whether a corresponding network element supports authentication according to the first protocol (e.g., has 802.1x capability) and/or to determine whether the corresponding network element supports authentication according to the second protocol. In some embodiments, the first switch 1210 may only query whether the corresponding network element supports authentication according to the first protocol. In other embodiments, the inventory database 1220 may return an identification of the authentication protocol, from among the first and second protocols, that the corresponding network element supports. The first switch 1210 may execute software to fetch the capability information, e.g., custom software using DOCKER.

The inventory database 1220 (implemented, for example, in a server device of the operator or a third party server device) maintains information about vendor equipment along with corresponding authentication capabilities. That is, the inventory database 1220 may store for each device information (e.g., model number, serial number, version number, etc.) capability information indicative of whether the corresponding network equipment supports authentication according to the first protocol and/or supports authentication according to the second protocol. Thus, upon or based on receiving the device information from the first switch 1220, the inventory database 1220 looks up the capability information of the corresponding network element and sends the capability information to the first switch 1210 and/or sends information indicative of whether the corresponding network element supports authentication according to the first protocol and/or the second protocol. According to an embodiment, even if a network element supports both the first protocol and the second protocol, the first switch 1210 may only query as to whether the first protocol is supported. In this case, the network element that supports both protocols may proceed with authentication in accordance with the first protocol. Further, according to another embodiment, the first switch 1210 may query as to whether both the first protocol and the second protocol are supported. In this case, the first switch 1210 may confirm or determine support of the second protocol for a network element that does not support the first protocol. Alternatively, in accordance with another embodiment, the first switch 1210 may only query as to the first protocol, and simply assume the second protocol if the first protocol is not supported for a network element.

At (3*a*) and (3*b*) of the communication flow, authentication of the corresponding network element is performed based on the capability information obtained from the inventory database 1220. That is, at (3*a*), if the network element 1200A, 1200N is determined to support authentication according to the first protocol (e.g., 802.1x) based on the capability information from the inventory database 1220, authentication is performed in accordance with the first protocol. For example, the first switch 1210 may acknowledge to the network element 1200A, 1200N that 802.1x authentication has been verified successfully for the network element 1200A, 1200N and the network element 1200A, 1200N may then initiate 802.1x authentication (e.g., as described below with reference to FIGS. 14A-14C) with the first authentication server 1230.

Upon successful authentication in accordance with the first protocol, certificate enrollment with an operator CA server is performed. For example, certificate enrollment over EST/CMPv2 protocol may be performed.

Meanwhile, at (3*b*), if the network element 1200B is determined to not support authentication according to the first protocol (or determined to support authentication according to only the second protocol from among the first and second protocols) based on the capability information from the inventory database 1220, authentication is performed in accordance with the second protocol. For example, the network element 1200B may proceed with DHCP authentication, such as described above with reference to FIGS. 1 through 6 and below with reference to FIG. 15. While the present embodiment is described with reference to two protocols, it is understood that the system and enhanced authentication according to other embodiments are not necessarily limited thereto, and may support and/or query any number of authentication protocols.

Figure 12:
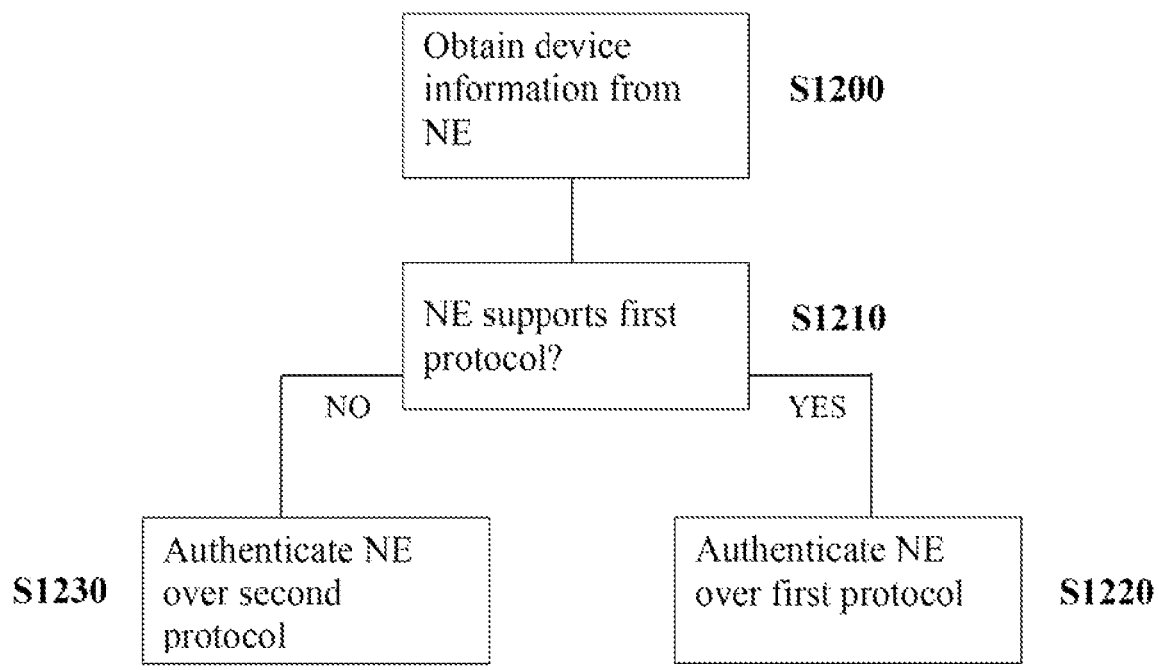
FIG. 12 is a flowchart of a method for performing an enhanced authentication procedure according to one or more embodiments.

FIG. 12 is a flowchart of a method for performing an enhanced authentication procedure according to one or more embodiments. Referring to FIG. 12, in operation S1200, a switch receives, from a network element, device information of the network element. For example, the device information may include at least one of a vendor name, a model number or identifier, a serial number, etc., of the network element (e.g., a non-VM network element).

In operation S1210, the switch uses the device information to query a database as to the network element's capability information. Specifically, the switch uses the device information to determine whether the network element supports a first protocol and/or a second protocol for authentication. For example, the switch may send the device information to a database or server in order to query the database or server as to the corresponding network element's authentication capability, that is, to determine whether a corresponding network element supports authentication according to the first protocol (e.g., has 802.1x capability) and/or to determine whether the corresponding network element supports authentication according to the second protocol If the switch verifies or determines that the network element supports authentication over the first protocol (e.g., 802.1x) (Yes at S1210), the switch performs authentication of the network element with an authentication server over the first protocol in operation S1220. For example, the switch may acknowledge to the network element that 802.1x authentication has been verified successfully for the network element and the network element may then initiate 802.1x authentication with the authentication server via the switch (e.g., as described below with reference to FIG. 13). Subsequently, upon successful authentication in accordance with the first protocol (e.g., 802.1x), the network element may enroll an operator device certificate with an operator CA.

Meanwhile, if the switch determines that the network element does not support authentication over the first protocol (No at S1210) and/or determines that the network element supports authentication in accordance with the second protocol (e.g., DHCP), the switch performs authentication of the network element with a second server (e.g., DHCP server) in operation S1230. For example, the network element may proceed with DHCP authentication and certificate enrollment, such as described above with reference to FIGS. 1 through 6, via the switch. To this end, the switch may receive security parameters (e.g., in a DHCP Request message) from the network element and send the security parameters (e.g., the DHCP Request message) to a DHCP server, which subsequently transmits the security parameters (including one or more additional security parameters, such as a nonce) to an authentication server. The switch may receive a result of the authentication (e.g., a DHCP Response message including information on an operator CA server) and send the result to the network element.

Figure 13:
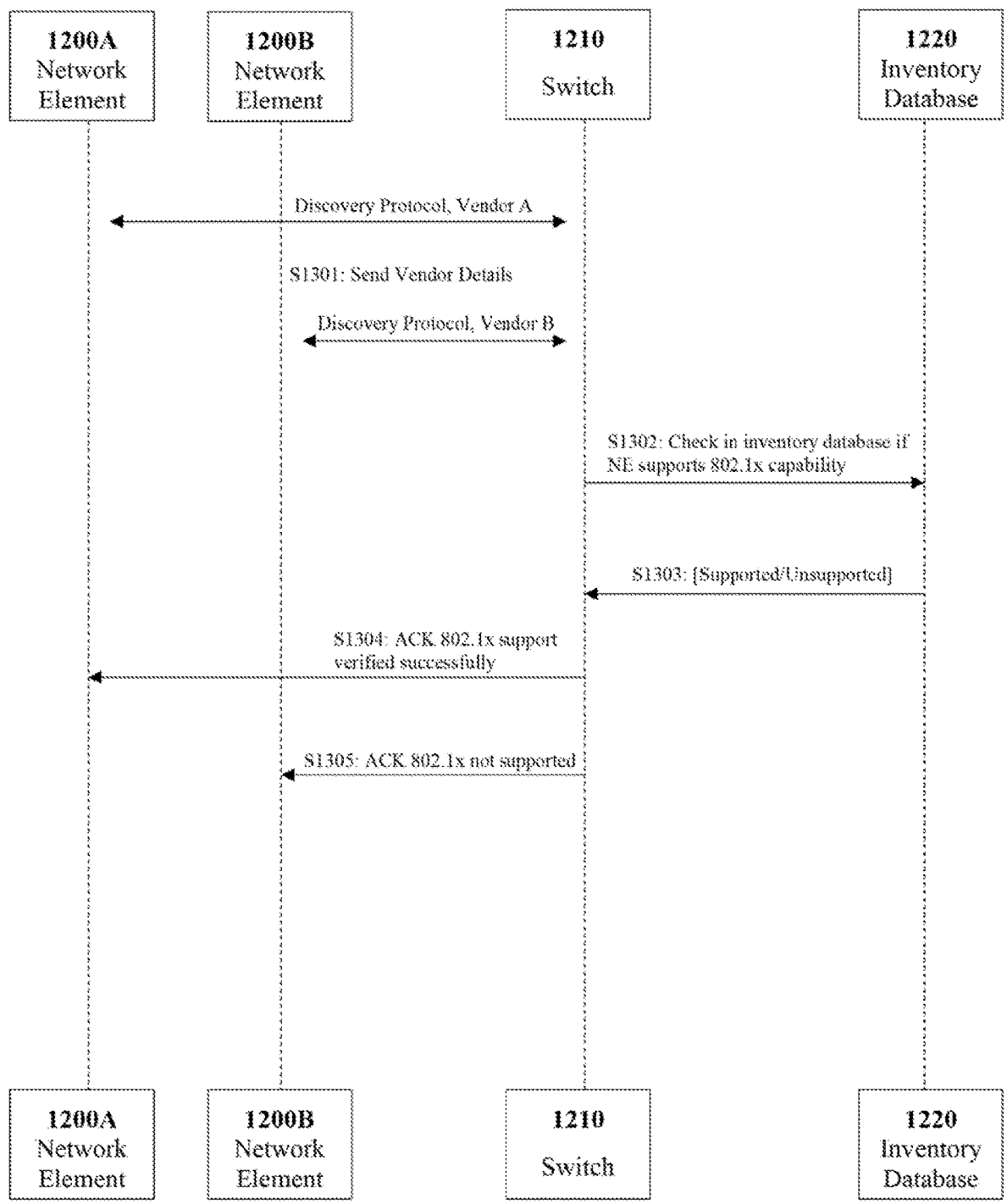
FIGS. 13, 14A-14C, and 15 illustrate message flows for an enhanced authentication procedure according to one or more embodiments.

FIG. 13 illustrates a message flow diagram for an enhanced authentication for network elements (e.g., O-RAN fronthaul elements) according to an embodiment. In particular, FIG. 13 illustrates a message flow diagram for determining whether a network element 1200A/1200B supports authentication in accordance with IEEE 802.1x. The network in the present embodiment can include network elements that both support and do not support 802.1x authentication. Specifically, the network includes a first network element 1200A (e.g., O-RU) of a first vendor and a second network element 1200B (e.g., O-RU) of a second vendor. The first network element 1200A supports 802.1x authentication, while the second network element 1200B does not support 802.1x authentication. The network further includes a switch 1210 and an inventory database 1220 (e.g., implemented in a server or computing device). The switch 1210 may be an 802.1x authenticator. Further, the switch 1210 may be a TOR switch. The first and second network elements 1200A and 1200B, the switch 1210, and the inventory database 1220 may correspond to those shown in and described above with reference to FIG. 11.

Referring to FIG. 13, at S1301 the first and second network elements 1200A/1200B send device information to the switch 1210. For example, the device information may be sent in accordance with a discovery protocol, such as an L2 discovery protocol. Further, the device information may be sent using TLV fields in Ethernet frames. The device information may include information such as a vendor name, a model number, a serial number, etc., of the corresponding network element 1200A/1200B.

At S1302, the switch 1210 sends the device information to the inventory database 1220 to query whether the first and second network elements 1200A and 1200B support 802.1x capability. The inventory database 1220 maintains information about vendor equipment along with corresponding authentication capabilities. For example, the inventory database 1220 may store for each device information (e.g., model number, serial number, version number, etc.) capability information indicative of whether the corresponding network equipment supports authentication in accordance with 802.1x. According to another embodiment, the inventory database 1220 may store for each device information capability information indicative of which authentication protocol(s) (from among plural different protocols) is supported by the corresponding network equipment.

The inventory database 1220 uses the device information to obtain or look up the 802.1x capability of the first and second network elements 1200A and 1200B, and sends a result (e.g., Supported or Unsupported) to the switch 1210 at S1303. Thus, for the first network element 1200A, the inventory database returns a result indicating that 802.1x authentication is supported, and for the second network element 1200B, the inventory database returns a result indicating that 802.1x authentication is not supported.

At S1304, the switch 1210 acknowledges or indicates to the first network element 1200A that 802.1x support is successfully verified, and at S1305, acknowledges or indicates to the second network element 1200B that 802.1x is not supported. Thereafter, the first network element 1200A can proceed with 802.1x authentication and operator certificate enrollment as shown, by way of example, in FIGS. 14A and 14B. In this case, IEEE 802.1x is enabled (or is maintained as enabled/not disabled) for a port for the network element 1200A in the switch 1210. Further, the second network element 1200B may proceed with DHCP authentication and operator certificate enrollment as described above with reference to FIGS. 1 through 6. In this case, IEEE 802.1x is disabled (or maintained as not enabled) for a port for the network element 1200B in the switch 1210.

Figure 14A:
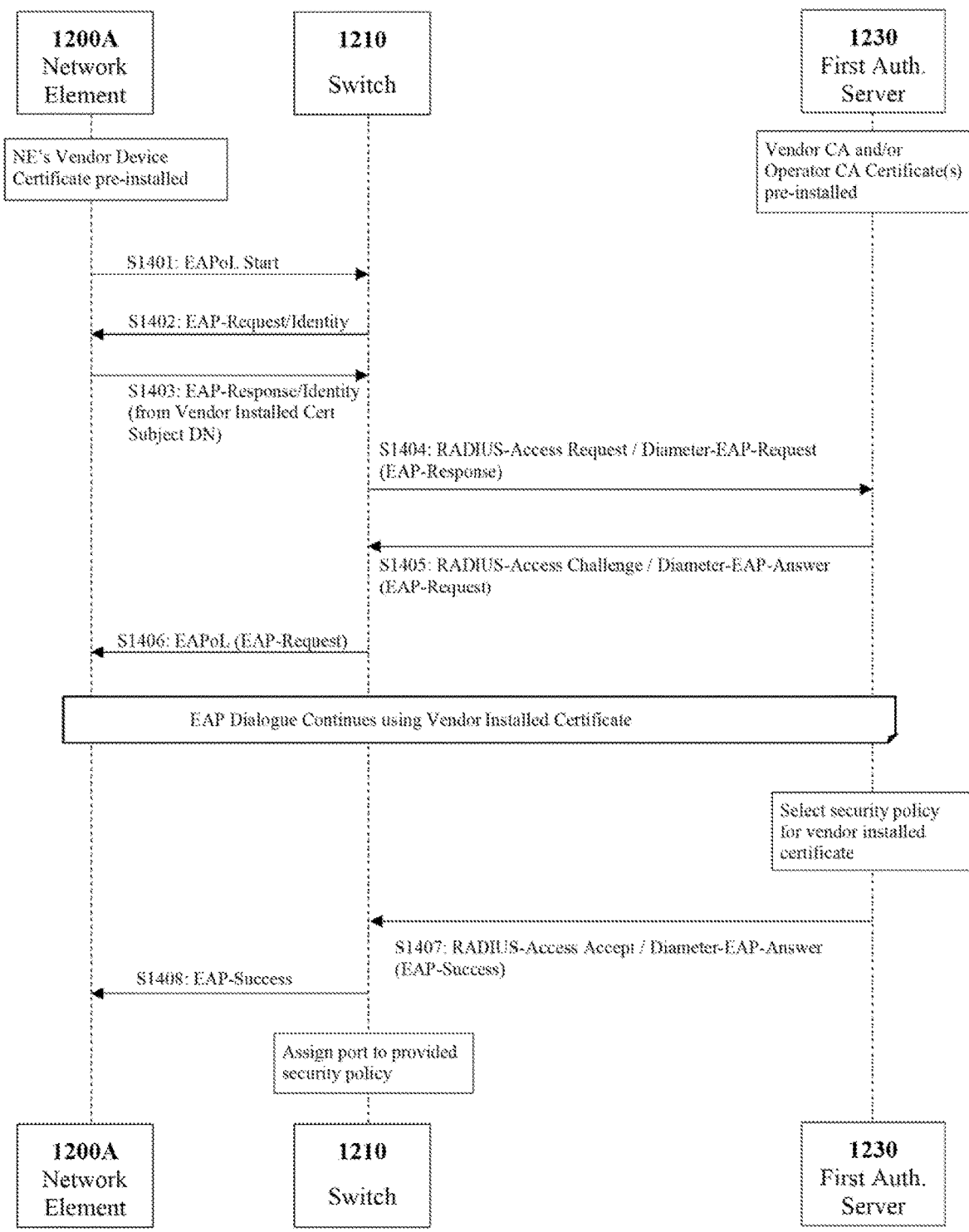

FIG. 14A illustrates a message flow diagram for an IEEE 802.1x authentication in accordance with an embodiment. The message flow of FIG. 14A may be performed to authenticate a network element that is determined to support 802.1x authentication in accordance with example embodiments, such as the first network element 1200A of FIG. 13. That is, the message flow of FIG. 14A may follow S1304 of FIG. 13. The first network element 1200A, the switch 1210, and the first authentication server 1230 may correspond to those shown in and described above with reference to FIG. 11.

Referring to FIG. 14A, the first network element 1200A initiates EAPOL by transmitting an EAPOL Start message to the switch 1210 in S1401. The switch 1210 transmits an EAP Identity request message (EAP-Request/Identity) to the first network element 1200A in S1402. The first network element 1200A then transmits an EAP Response to the switch 1210 in S1403. The switch 1210 then sends a RADIUS Access-Request or a Diameter-EAP-Request to a first authentication server 1230 at S1404. The first authentication server 1230 may respond with a RADIUS Access-Challenge or a Diameter-EAP-Response message at S1405, and the switch may send an EAP-Request to the first network element 1200A at S1406. The EAP dialogue may then continue using a vendor installed certificate. The first authentication server 1230 may then select a security policy for the NE's vendor-installed certificate and transmit a RADIUS Access-Accept or Diameter-EAP-Answer message indicating successful authentication, at S1407. The switch 1210 may then send an EAP-Success message at S1408, and assign a port to the provided security policy.

Figure 14B:
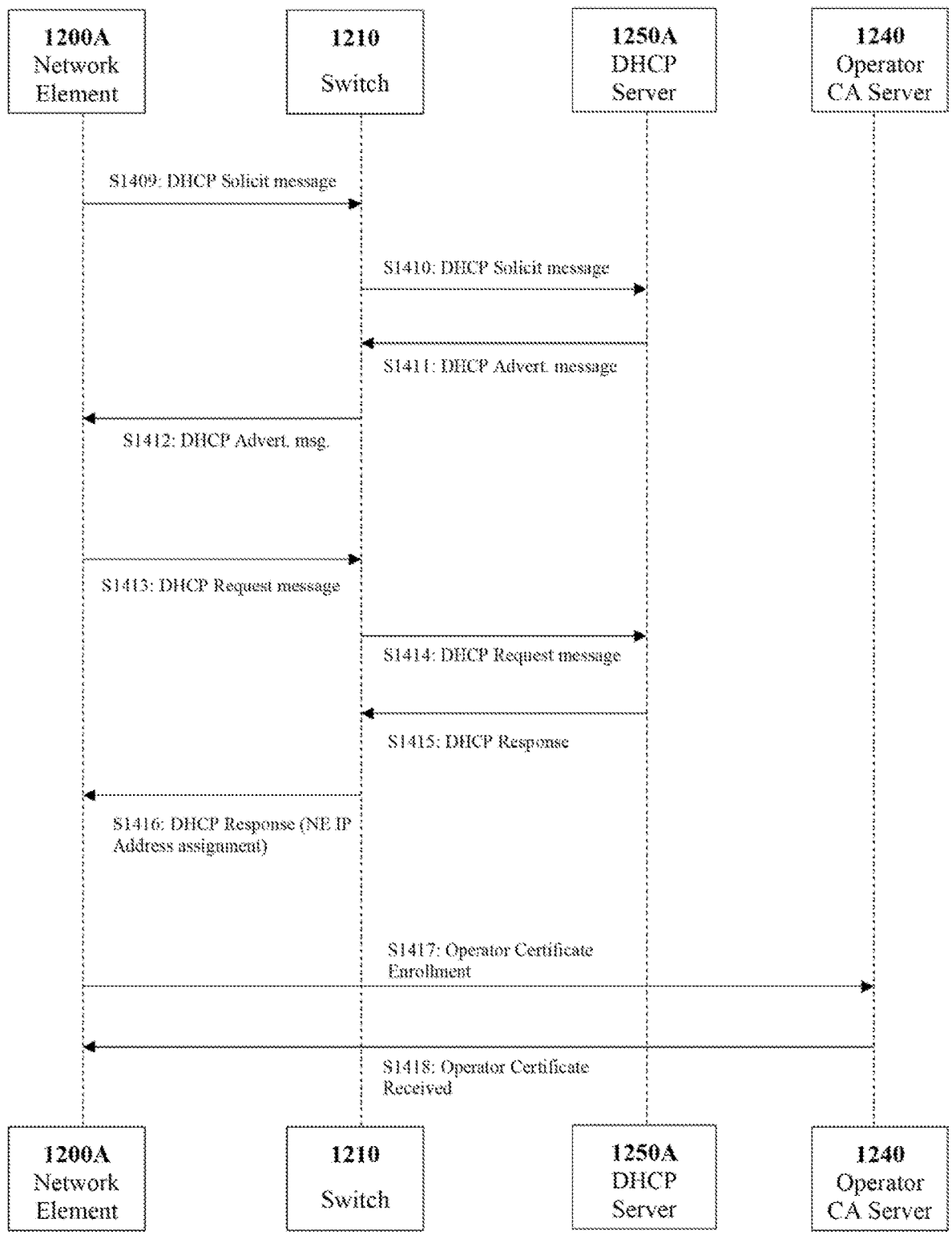
Figure 14C:
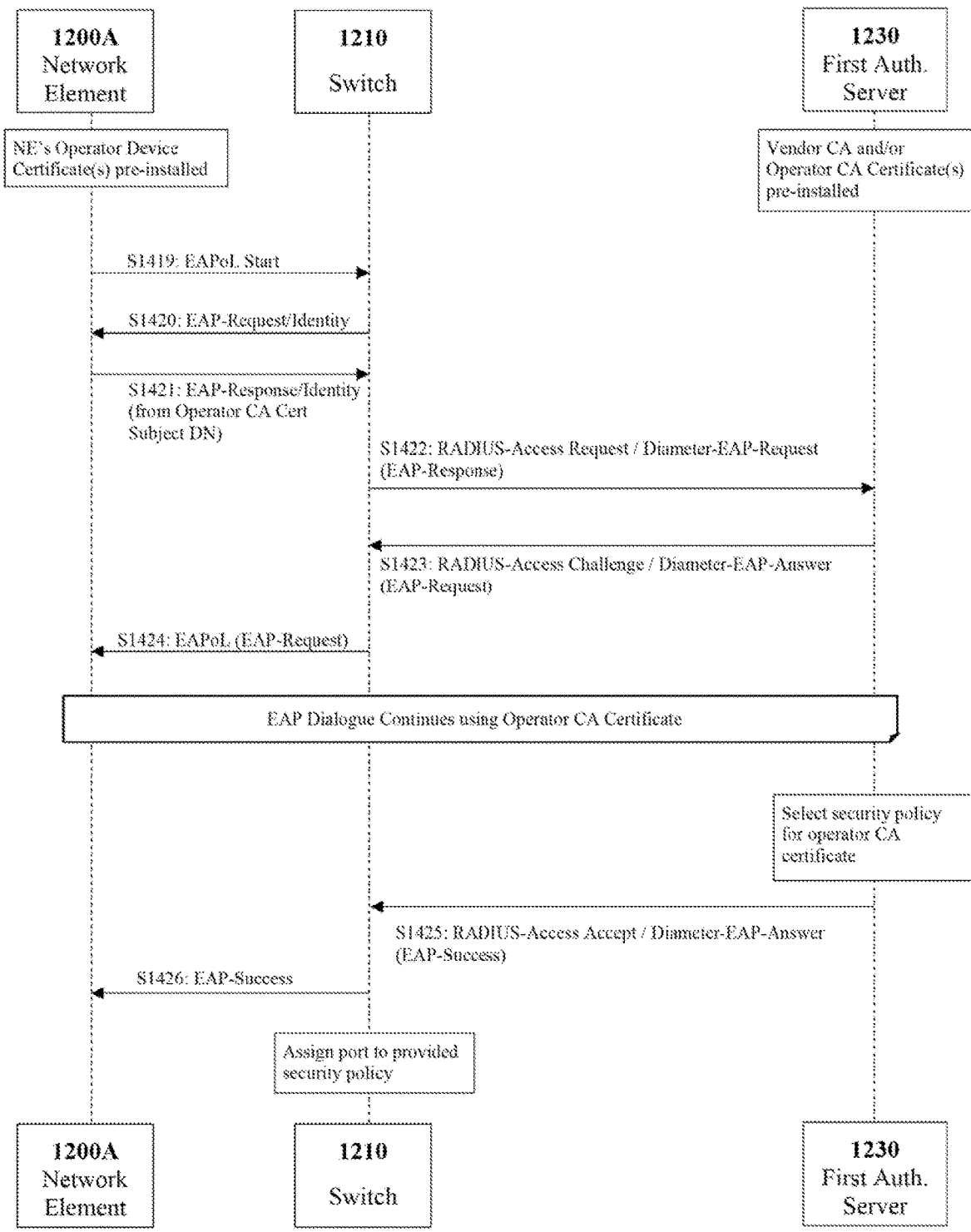

Upon successful authentication, the first network element 1200A may then enroll a certificate with a CA server (e.g., operator CA server). In this regard, the initial 802.1x authentication performed in FIG. 14A may be performed with a vendor CA certificate. A subsequent authentication may then be performed with an operator issued certificate (such that a security policy for the operator installed certificate is selected), as shown in FIG. 14C. FIG. 14B illustrates a message flow diagram for assigning an IP address and enrolling an operator CA certificate following a successful 802.1x authentication, according to an embodiment. As shown in FIG. 14B, in order to enroll with the operator CA, the first network element 1200A obtains an IP address assigned statically or dynamically using, for example, DHCP discovery.

Referring to FIG. 14B, at S1409, the first network element 1200A sends a DHCP Solicit message to the switch 1210, which forwards it at S1410 to the DHCP server 1250A. In response, at S1411, the DHCP server 1250A transmits a DHCP Advertise message to the switch 1210, which forwards it at S1412 to the first network element 1200A. The first network element 1200A generates and sends a DHCP Request message to the switch 1210 at S1413, which forwards it to the DHCP server 1250A at S1414. The DHCP server 1250A transmits a DHCP Response to the switch 1210, which forwards it to the first network element 1200A at S1416. The DHCP Response includes the IP address assigned by the DHCP server 1250A to the first network element 1200A. Subsequently, the first network element 1200A requests an operator issued certificate from the operator CA server 1240 at S1417, and receives the operator issued certificate in S1418.

As set forth above, the message flow of FIG. 14A may be performed for an initial limited access when authenticating using a vendor certificate. A subsequent full operational access may then be granted by authenticating using an operator installed certificate (as issued pursuant to FIG. 14B, for example). In the latter case, by way of example, a restart of the network element may trigger an interface re-initialization in which the switch 1210 resets the port to an unauthorized state and blocks traffic except for EAPOL traffic until the authentication succeeds.

FIG. 14C illustrates a message flow diagram for an IEEE 802.1x authentication using an operator CA certificate (as issued pursuant to FIG. 14B, for example) in accordance with an embodiment. That is, the message flow of FIG. 14C may follow S1418 of FIG. 14B. The message flow of FIG. 14C may be performed for a full operational access after an initial authentication (as performed pursuant to FIG. 14A, for example).

Referring to FIG. 14C, the first network element 1200A initiates EAPOL by transmitting an EAPOL Start message to the switch 1210 in S1419. The switch 1210 transmits an EAP Identity request message (EAP-Request/Identity) to the first network element 1200A in S1420. The first network element 1200A then transmits an EAP Response to the switch 1210 in S1421. The switch 1210 then sends a RADIUS Access-Request or a Diameter-EAP-Request to a first authentication server 1230 at S1422. The first authentication server 1230 may respond with a RADIUS Access-Challenge or a Diameter-EAP-Response message at S1423, and the switch may send an EAP-Request to the first network element 1200A at S1424. The EAP dialogue may then continue using an operator CA certificate. The first authentication server 1230 may then select a security policy for the NE's vendor-installed certificate and transmit a RADIUS Access-Accept or Diameter-EAP-Answer message indicating successful authentication, at S1425. The switch 1210 may then send an EAP-Success message at S1426, and assign a port to the provided security policy.

Figure 15:
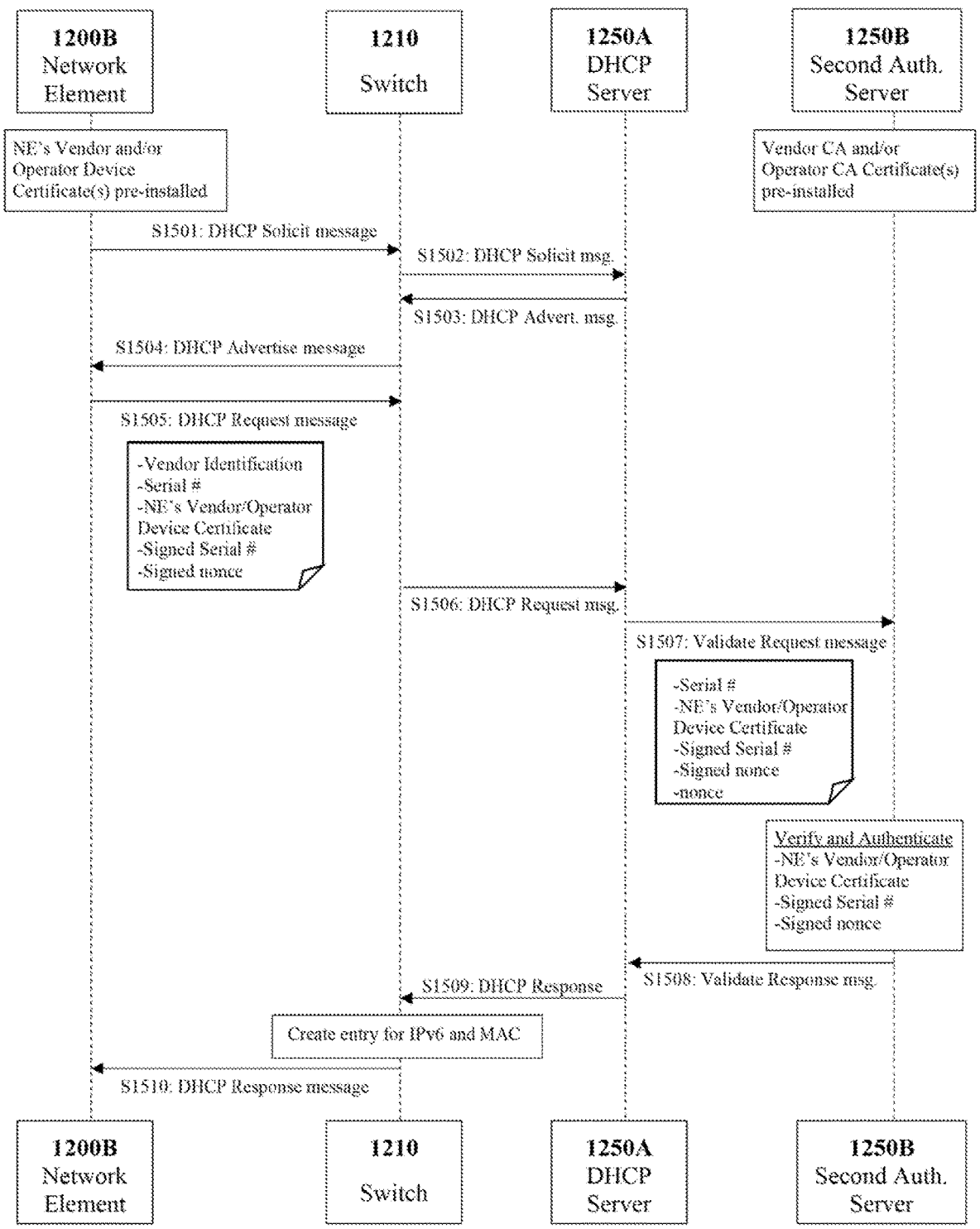

FIG. 15 illustrates a message flow diagram for a DHCP authentication in accordance with an embodiment. The message flow of FIG. 15 may be performed to authenticate a network element that is determined to not support 802.1x authentication in accordance with example embodiments, such as the second network element 1200B of FIG. 13. That is, the message flow of FIG. 15 may follow S1305 of FIG. 13. The second network element 1200A and the switch 1210 may correspond to those shown in and described above with reference to FIG. 11, and the DHCP server 1250A and the second authentication server 1250B may correspond to the at least one second server 1250 shown in and described above with reference to FIG. 11.

Referring to FIG. 15, at S1501, the second network element 1200B sends a DHCP Solicit message to the switch 1210, which forwards it at S1502 to the DHCP server 1250A. In response, at S1503, the DHCP server 1250A transmits a nonce in a DHCP Advertise message to the switch 1210, which forwards it at S1504 to the second network element 1200B. Here, the nonce may be generated by the DHCP server 1250A (e.g., for a one-time use), for example, in response to receiving the DHCP Solicit message. The second network element 1200B generates and sends a DHCP Request message to the switch 1210 at S1505, which forwards it to the DHCP server 1250A at S1506. The DHCP Request message includes vendor information, the NE's serial number, the NE's device certificate, the signed serial number, and the signed nonce. Here, the DHCP Request message may either include the NE's vendor device certificate pre-installed in the second network element 1200B (which may be referred to as an invalid operator device certificate), or an operator (e.g., mobile network operator or telco) device certificate (or operator CA certificate) that the second network element 1200B already has (which may be referred to as a valid operator device certificate), e.g., a root certificate from the operator's CA. The DHCP server 1250A sends the security parameters (serial number, device certificate, signed serial number, signed nonce, and nonce) in a Validate Request message to the second authentication server 1250B at S1507. The second authentication server 1250B verifies the device certificate using a corresponding vendor or operator CA certificate pre-installed therein, and verifies the signed serial number and signed nonce. Based on the verification, the second authentication server 1250B transmits a Validate Response message indicating success or fail to the DHCP server 1250A at S1508. Based on the Validate Response message indicating success, the DHCP server 1250A sends a DHCP Response to the switch 1210 at S1509, which then sends it to the second network element 1200B at S1510. The DHCP Response received by the second network element 1200B includes the second network element's IP address and the CA server's information (e.g., the CA server's FQDN, Port, and/or IP). Further, the DHCP Response may include additional information, such as at least one of the operator CA root certificate, DNS and other details, etc. The second network element 1200B may then enroll an operator CA certificate with the CA server as described above with reference to FIGS. 1 through 6.

As described above, an enhanced authentication procedure according to one or more embodiments allows a network (e.g., O-RAN) to include network elements that both support and do not support 802.1x authentication. An authenticator (e.g., a network operator switch or TOR switch) may obtain identification information (such as at least one of vendor details, model number, and a serial number) of the network elements via a discovery protocol, and may then query an inventory database to determine if a corresponding network element supports 802.1x authentication If the network element does not support 802.1x authentication, then DHCP authentication is performed, such as described above with reference to FIGS. 1 through 6 and shown in FIG. 15. Conversely, if 802.1x authentication is supported, then the authenticator successfully acknowledges such support to the network element, the network element initiates 802.1x EAPOL authentication, and the authenticator requests authentication via RADIUS/TACACS+ from an authentication server, as shown in FIG. 14A. Upon successful authentication, certificate enrollment with a CA server occurs, e.g., over EST/CMPv2 protocol.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features from one or more embodiments may be combined with one or more features of one or more other embodiments described above.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for performing an enhanced authentication procedure in a mobile communications network, the system comprising:
   a first network element with IEEE 802.1x support;
   a second network element without IEEE 802.1x support;
   a storage device configured to store authentication capabilities of network elements in the mobile communications network;
   a switch configured to obtain device information from the first network element and the second network element, and to transmit the obtained device information to the storage device in order to determine whether each of the first network element and the second network element supports IEEE 802.1x authentication;
   a first authentication server configured to perform authentication in accordance with IEEE 802.1x;
   at least one server configured to perform Dynamic Host Configuration Protocol (DHCP) authentication; and
   an operator certificate authority configured to enroll certificates for network elements in the mobile communication network,
   wherein the first network element is configured to initiate the IEEE 802.1x authentication with the switch based on the switch determining that the first network element supports the IEEE 802.1x authentication, the first authentication server is configured to authenticate the first network element, and the first network element is configured to enroll a certificate with the operator certificate authority based on a successful authentication, and
   wherein the second network element is configured to initiate a DHCP authentication with the at least one server configured to perform DHCP authentication based on the switch determining that that the second network element does not support the IEEE 802.1x authentication, to obtain information on the operator certificate authority from the at least one server upon authentication, and to enroll a certificate with the operator certificate authority based on the obtained information on the operator certificate authority.

2. The system according to claim 1, wherein the device information comprises at least one of vendor name, model identifier, and serial number.

3. The system according to claim 1, wherein the second network element is configured to initiate the DHCP authentication with the at least one server, via the switch.

4. The system according to claim 1, wherein:
   the at least one sever comprises a DHCP server and a second authentication server; and
   the DHCP server is configured to:
      receive, from the switch, a request by the second network element for obtaining the information on the operator certificate authority, the request including at least one security parameter,
      send the at least one security parameter to the second authentication server to perform an authentication of the second network element,
      receive a result of the authentication from the second authentication server, and
      send, to the switch, the information on the operator certificate authority based on the result of the authentication indicating a successful authentication.

5. The system as claimed in claim 4, wherein:
   the at least one security parameter comprises a device certificate pre-installed at both the second network element and the second authentication server; and
   the second authentication server is configured to perform the authentication by verifying, using the device certificate pre-installed therein, the device certificate included in the at least one security parameter.

6. The system as claimed in claim 1, wherein the switch is configured to:
   acknowledge to the first network element that support of the IEEE 802.1x authentication is verified for the first network element, based on determining via the storage device that the first network element supports the IEEE 802.1x authentication; and acknowledge to the second network element that the IEEE 802.1x authentication is not supported for the second network element, based on determining via the storage device that the second network element does not support the IEEE 802.1x authentication.

7. The system as claimed in claim 1, wherein the switch is configured to obtain the device information in accordance with a Layer 2 discovery protocol.

8. The system as claimed in claim 1, wherein the storage device is an inventory database that maintains IEEE 802.1x capability information for different network elements of different vendors.

9. The system as claimed in claim 1, wherein the first network element is an O-RAN Radio Unit (O-RU) of a first vendor, and the second network element is an O-RU of a second vendor.

10. A network device for facilitating authentication of network elements in a mobile communications network, the network device comprising:
a memory storing instructions; and
at least one processor configured to execute the instructions to:
obtain device information from a network element,
transmit the obtained device information to a storage device in order to determine whether the network element supports authentication in accordance with a first authentication protocol,
based on determining that the network element supports the authentication in accordance with the first authentication protocol, facilitate authentication of the network element with an authentication server configured to perform the authentication in accordance with the first authentication protocol, and
based on determining that the network element does not support the authentication in accordance with the first authentication protocol, facilitate the authentication of the network element with at least one server configured to perform authentication in accordance with a second authentication protocol, obtain information on an operator certificate authority from the at least one server upon successful authentication, and provide the obtained information on the operator certificate authority to the network element.

11. The network device according to claim 10, wherein the first authentication protocol is an IEEE 802.1x authentication protocol.

12. The network device according to claim 11, wherein the at least one processor is configured to facilitate the authentication, with the authentication server, as an IEEE 802.1x Authenticator configured to collect authentication credentials from Supplicants and sending the authentication credentials to the authentication server.

13. The network device according to claim 11, wherein the second authentication protocol is a Dynamic Host Configuration Protocol (DHCP) authentication.

14. The network device according to claim 13, wherein the at least one processor is configured to facilitate the authentication, with the at least one server, by receiving authentication credentials from the network element and sending the authentication credentials to a DHCP server from among the at least one server.

15. A method of authenticating network elements in a mobile communications network, the method comprising:
obtaining first device information from a first network element;
transmitting the obtained device information to a storage device in order to determine whether the first network element supports authentication in accordance with the first authentication protocol; and
based on determining that the first network element does not support the authentication in accordance with the first authentication protocol, facilitating authentication of the first network element with at least one server configured to perform authentication in accordance with a second authentication protocol, obtaining information on an operator certificate authority from the at least one server upon successful authentication, and providing the obtained information on the operator certificate authority to the first network element.

16. The method according to claim 15, further comprising:
obtaining second device information from a second network element;
transmitting the obtained device information to the storage device in order to determine whether the second network element supports the authentication in accordance with the first authentication protocol;
based on determining that the second network element supports the authentication in accordance with the first authentication protocol, facilitating authentication of the second network element with an authentication server configured to perform the authentication in accordance with the first authentication protocol.

17. The method according to claim 15, wherein the first authentication protocol is an IEEE 802.1x protocol, and the second authentication protocol is a Dynamic Host Configuration Protocol (DHCP) protocol.

18. The method according to claim 17, wherein the facilitating the authentication of the first network element with the at least one server comprises receiving authentication credentials from the first network element and sending the authentication credentials to a DHCP server from among the at least one server.

19. The method according to claim 16, wherein the first authentication protocol is an IEEE 802.1x protocol, and the second authentication protocol is a DHCP protocol.

20. A non-transitory computer-readable recording medium having recorded thereon a computer-program executable by at least one processor to cause the processor to perform the method of claim 15.

* * * * *